(12) United States Patent
Tangler et al.

(10) Patent No.: US 8,197,218 B2
(45) Date of Patent: Jun. 12, 2012

(54) QUIET AIRFOILS FOR SMALL AND LARGE WIND TURBINES

(75) Inventors: James L. Tangler, Boulder, CO (US); Dan L. Somers, Port Matilda, PA (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 1242 days.

(21) Appl. No.: 11/937,183

(22) Filed: Nov. 8, 2007
(Under 37 CFR 1.47)

(65) Prior Publication Data
US 2009/0123289 A1    May 14, 2009

(51) Int. Cl.
*F03D 1/06*    (2006.01)
(52) U.S. Cl. .............. 416/238; 416/243; 416/DIG. 2
(58) Field of Classification Search .............. 416/223 R, 416/238, 242, 243, DIG. 2, DIG. 5
See application file for complete search history.

(56) References Cited

U.S. PATENT DOCUMENTS

| | | | |
|---|---|---|---|
| 4,976,587 A * | 12/1990 | Johnston et al. ............ | 416/230 |
| 5,417,548 A | 5/1995 | Tangler et al. | |
| 5,562,420 A | 10/1996 | Tangler et al. | |
| 6,068,446 A | 5/2000 | Tangler et al. | |
| 6,899,524 B1 | 5/2005 | Tangler et al. | |
| 2007/0105321 A1 | 5/2007 | Lee | |

FOREIGN PATENT DOCUMENTS

| | | |
|---|---|---|
| CA | 2524208 A1 | 11/2004 |
| CA | 2554666 C | 1/2011 |

OTHER PUBLICATIONS

International Preliminary Report on Patentability dated Feb. 27, 2009, for International Application No. PCT/US08/83000.

* cited by examiner

*Primary Examiner* — Nathaniel Wiehe
(74) *Attorney, Agent, or Firm* — W. LaNelle Owens; Paul J. White; John C. Stolpa

(57) ABSTRACT

Thick airfoil families with desirable aerodynamic performance with minimal airfoil induced noise. The airfoil families are suitable for a variety of wind turbine designs and are particularly well-suited for use with horizontal axis wind turbines (HAWTs) with constant or variable speed using pitch and/or stall control. In exemplary embodiments, a first family of three thick airfoils is provided for use with small wind turbines and second family of three thick airfoils is provided for use with very large machines, e.g., an airfoil defined for each of three blade radial stations or blade portions defined along the length of a blade. Each of the families is designed to provide a high maximum lift coefficient or high lift, to exhibit docile stalls, to be relatively insensitive to roughness, and to achieve a low profile drag.

11 Claims, 9 Drawing Sheets

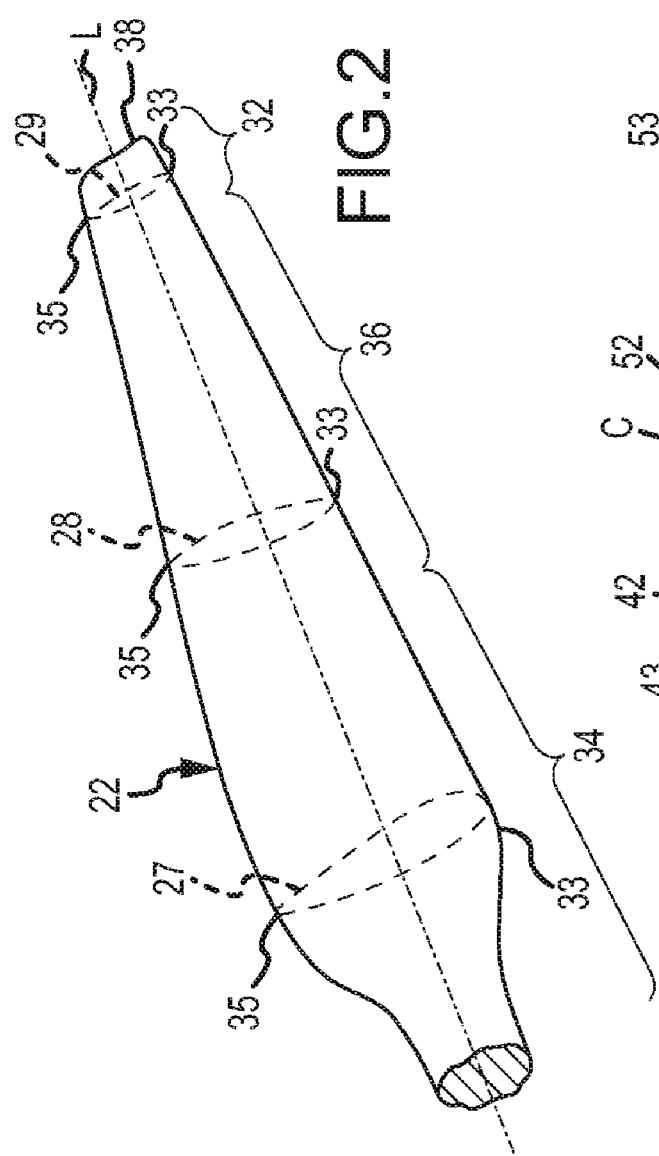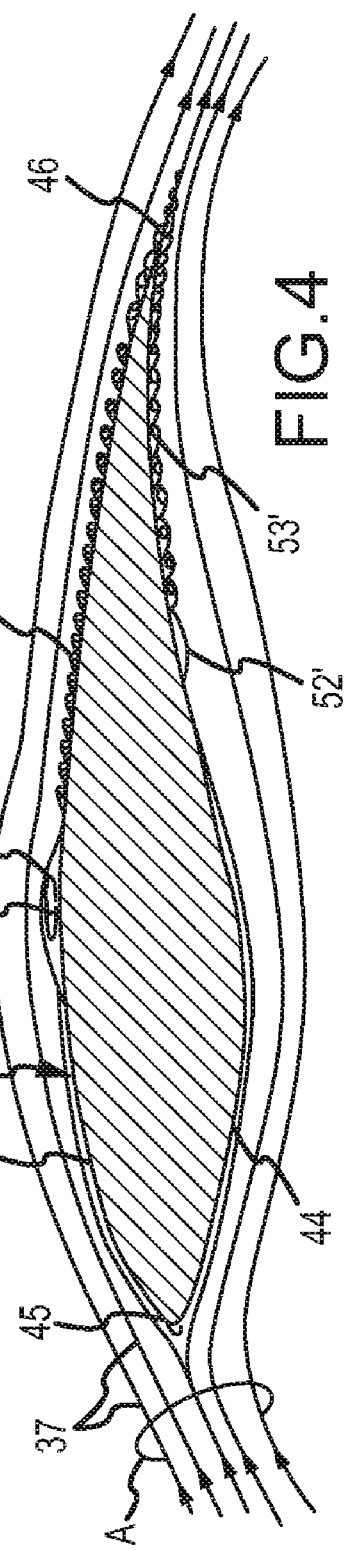

US 8,197,218 B2

QUIET AIRFOILS FOR SMALL AND LARGE WIND TURBINES

CONTRACTUAL ORIGIN

The United States Government has rights in this invention under Contract No. DE-AC36-99GO-10337 between the United States Department of Energy and the National Renewable Energy Laboratory, a Division of the Midwest Research Institute.

BACKGROUND

There is increasing interest in developing wind powered generator systems in which electricity produced by a single wind powered generator or a group of wind powered generators can be supplied to utility power grids. A conventional wind turbine for generating electric power includes two or more turbine blades or vanes connected to a central hub. The hub rotates about a horizontal axis and is connected to a shaft that drives an electric power generator. Wind turbines operate at either a constant rotational speed despite changes in wind velocity or at variable rotational speeds that are proportional to the wind velocity. Peak power at high wind speeds is usually controlled through stall regulation or through the use of variable pitch turbine blades.

The portion of the turbine blade closest to the hub is called the root of the blade, and the portion of the turbine blade farthest from the hub is called the tip of the blade. A cross-section of a turbine blade taken perpendicular to the imaginary line connecting the blade's root to the blade's tip is generally referred to as an airfoil. Theoretically, each turbine blade includes an infinite number of airfoils along the imaginary line. However, a blade's shape is more practically defined in reference to a finite number of the airfoil shapes. In this regard, the geometric shape of an airfoil is usually expressed in tabular form in which the x, y coordinates of both the upper and lower surfaces of the airfoil at a given cross-section of the blade are measured with respect to the chord line, which is an imaginary line connecting the leading edge of the airfoil and the trailing edge of the airfoil. Both x and y coordinates are expressed as fractions of the chord length.

Another important parameter of an airfoil is its thickness. The thickness of an airfoil refers to the maximum distance between the airfoil's upper surface and the airfoil's lower surface and is generally provided as a fraction of the airfoil's chord length. For example, a fourteen percent thick airfoil has a maximum thickness (i.e., a maximum distance between the airfoil's upper surface and the airfoil's lower surface) that is fourteen percent of the airfoil's chord length. The chord length of an airfoil or cross-section of a turbine blade will typically become larger if the length of the blade increases and will typically become smaller if the length of the blade becomes smaller. Therefore, a table of coordinates for the geometry of the upper and lower surfaces of an airfoil remain valid for blades of different lengths because the coordinates are dimensionless and are provided as percentages of the chord length of the airfoil.

Another important parameter for every airfoil or blade cross-section is its operating Reynolds number. The Reynolds number of an airfoil at a particular radial station is dimensionless and is defined by the following equation: $R = cV/v$ where "R" is the Reynolds number, "c" is the chord length of the airfoil, "v" is the flow velocity relative to the blade at the corresponding radial point on the blade, and "v" is the kinematic viscosity of the air. Physically, the Reynolds number can be thought of as the ratio of the inertial force to the viscous force of air flow around a turbine blade. Viscous force is proportional to the shearing stress in the air flow divided by the rate of shearing strain, and inertial force is proportional to the product of the mass of the air flow multiplied by its acceleration. In practice, airfoil performance characteristics are expressed as a function of the airfoil's Reynolds number. As the length of a blade decreases, the blade's Reynolds number tends to decrease. For a particular airfoil along the blade span, a small Reynolds number indicates that viscous forces predominate while a large Reynolds number indicates that inertial forces predominate.

Conversion of wind power into electrical power is accomplished in most wind powered systems by connecting a wind-driven turbine to the shaft that drives an electric generator. An important concern for the wind power industry is mitigating rotor noise. Airfoil induced noise can be caused by a number of operating conditions or design characteristics including noise caused by inflow turbulence interaction with the leading edge of the blade or airfoil, noise associated with airfoil thickness effects, airfoil generated laminar separation bubbles, and noise generated by boundary layer interaction with the trailing edge of the blade or airfoil. Many consider the noise associated with the trailing edge to be the most significant. Aerodynamic noise sources can be obstacles to commercialization of both large and small wind turbines, and when these noise sources are not taken into account it is difficult to obtain a balance between airfoil performance and noise mitigation. In general, good airfoil performance and low noise coincide.

However, to date, airfoil designers have primarily concentrated on achieving good performance characteristics with their airfoil design with little or no consideration given to reducing noise. Significantly, the design process of airfoils for small machines or wind turbines, with Reynolds numbers on the order of 500,000, is quite different from the design of airfoils for very large machines or wind turbines, with Reynolds numbers on the order of 4,000,000 or larger. For small wind turbines, performance degradation and noise from laminar separation bubbles is of greater concern, but most best practice airfoil design was performed for larger machines and then simply transferred to the small machines which can result in reduced overall performance and increased noise.

Another concern for of wind turbine designers is providing a desired stiffness of the blades. Thick blade root airfoils are typically desirable for greater blade stiffness and high natural frequency placement. Blade stiffness increases in proportion to the airfoil thickness squared. Blades with a thick inboard region are more stable against buckling and a thick inboard region also reduces material requirements. However, airfoil drag increases with airfoil thickness along with an increase in the airfoil's sensitivity to roughness, which increases as the blade get coated with dirt, bugs, and other airborne contaminants. Additionally, greater airfoil thickness results in greater air displacement and associated noise.

Hence, there remains a need for families of improved airfoils to shape and condition the local airflow around blades for more efficient operation and wind power conversion to mechanical or electric power. Preferably, such airfoil families would be suitable for use with small and large wind turbines and would provide a desirable balance between the need for a quiet and stiff blade that also provides high performance, e.g., provide a desired balance between blade thickness, noise control, and airfoil performance.

SUMMARY

Thick airfoil families are provided with desirable aerodynamic performance with minimal airfoil induced noise. The airfoil families are suitable for a variety of wind turbine designs and are particularly well-suited for use with horizontal axis wind turbines (HAWTs) with constant or variable speed using pitch and/or stall control. In exemplary embodiments, a first family of three thick airfoils is provided for use with small wind turbines and second family of three thick airfoils is provided for use with very large machines, e.g., an airfoil defined for each of three blade radial stations or blade portions defined along the length of a blade. Each of the families is designed to provide a high maximum lift coefficient (or high lift), to exhibit docile stalls, to be relatively insensitive to roughness, and to achieve a low profile drag.

More specifically, the first airfoil family in one embodiment includes a 15 percent thick tip airfoil, an 18 percent thick outboard airfoil, and a 21 percent thick root airfoil that are designed for use with wind turbines having a blades of about 0.5 to 5 meters in length. The airfoils of the first family are designed to have maximum lift coefficients of about 1.0, 1.1, and 1.2 at Reynolds numbers of about 400,000; 400,000, and 250,000, respectively and are designed to have low noise generated by boundary layer, trailing edge interaction, and from laminar separation bubbles and minimal sensitivity to roughness. The second airfoil family in one embodiment has airfoils designed for use with large wind turbines with blades of about 15 to 30 meters in length and designed to minimize noise generated by boundary layer, trailing edge interaction. The three airfoils of the second family include: a 21 percent thick airfoil for use at the 0.75 blade radial station designed to have a maximum lift coefficient of about 1.6 at a Reynolds number of about 4,000,000 and over; an 18 percent thick airfoil for use at the 0.90 blade radial station designed to have a maximum lift coefficient of about 1.5 at a Reynolds number of about 3,500,000 and over; and a 15 percent thick airfoil for use at the 1.0 blade radial station designed to have a maximum lift coefficient of about 1.4 at a Reynolds number of about 2,500,000 and over (note, the positioning of the airfoils may vary widely from the exemplary stations provided such as plus or minus ten percent).

BRIEF DESCRIPTION OF THE DRAWINGS

FIG. 2 is an isometric view of one of the turbine blades of the turbine of FIG. 1 illustrating a family of airfoils used to define a configuration of the blade, with the airfoils shown with dashed lines in the root, outboard, and tip portions of the blade;

FIG. 4 is another view of the airfoil of FIG. 3 showing a region of laminar air flow and a region of turbulent flow prior to a transition to full or more full turbulent flow at maximum lift;

DESCRIPTION

The following describes airfoils for use with small and large turbines, and the airfoils address the desire for quiet or reduced noise turbine blades while also addressing the demand for thick blades with high performance characteristics such as by providing less drag and less sensitivity to roughness. The following description begins with a general description of wind turbines and turbine blades and then, proceeds to more specific descriptions of two exemplary airfoil families. One of these families is particularly well-suited to small wind turbines with blades less than about 5 meters in length while the other family of airfoils is better suited for large turbines such as those over 20 meters in blade length and turbines with blade lengths up to about 50 meters.

Figure 1:
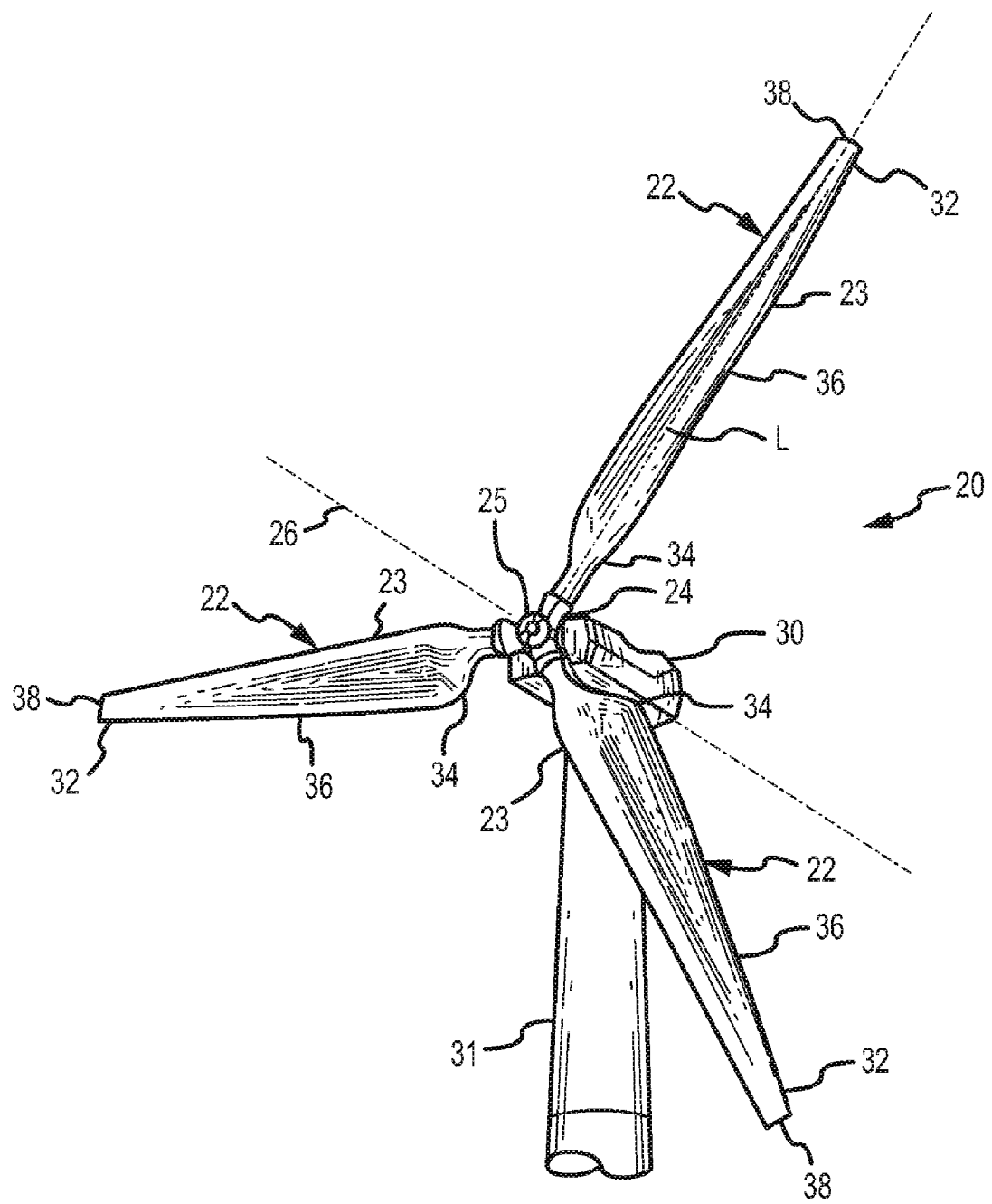
FIG. 1 is a perspective view of a horizontal axis wind turbine (HAWT) having three blades that may each include the airfoils or airfoil families.

An exemplary upwind horizontal axis wind turbine 20 (HAWT) having rotor blades 22 using the airfoils described herein is illustrated in FIG. 1. Each of the blades 22 of the wind turbine 20 has a leading edge 23 and is connected to a hub 24. The hub 24 is mounted on a rotatable horizontal shaft 25 that defines a horizontal axis 26 of rotation. The wind turbine 20 and shaft 25 rotate about the horizontal axis 26 of rotation when the wind striking the blades 22 is sufficiently strong. Each blade 22 includes, and is defined by, an infinite number of cross-sections or airfoils, including the example airfoils 27, 28, 29 shown in FIG. 2, with each airfoil being perpendicular to the imaginary line L on the blade 22 that extends radially outward from the axis 26 through the tip 38 of the blade 22. The shape, contour, and length of the blades 22 determine, in large part, the efficiency and power production capabilities of the wind turbine 20, and the particularly advantageous parameters of the blades 22 described below form one portion of the concepts described herein. One feature of the airfoils is that the airfoils are designed to be thick but also quiet as will also be discussed in more detail below.

The hub 24 of the wind turbine 20, as mentioned above, is typically mounted on a rotatable shaft 25, which is itself connected either directly or through a power transmission mechanism (not shown) to drive the electric generator (not shown) located in the nacelle 30. The rotation of the blades 22, hub 24, and shaft 25 about the axis 26 causes the electric generator (not shown) located in the nacelle 30 to generate electric energy or power, which can be transmitted to a utility or power grid (not shown) or to an electric energy storage facility or device (not shown). The nacelle 30 is usually supported by a tower 31 so that the blades 22 extend into the wind and clear the ground during rotation. The general design of the hub 24, the nacelle 30, the tower 31, and the electric generator positioned within the nacelle 30 are well known to persons having ordinary skill in this art. Hence, no further discussion of these components of the wind turbine system 20 is required for purposes of describing the airfoils.

Each blade 22 of the wind turbine 20 comprises three distinctive portions as illustrated in FIG. 2: (i) the tip portion or region 32, which includes the portion of the blade 22 that is most distant from the axis 26; (ii) the root portion or region 34, which includes the portion of the blade 22 that is closest to the axis 26; and (iii) the outboard portion or mid-span region 36, which includes the portions of the blade 22 between the tip region 32 and the root region 34. The root region 34 of the blade 22 generally extends radially outward from the axis 26 to a point on the blade 22 that is approximately fifty percent (50%) of the distance from the axis 26 to the tip 38 of the blade 22. The outboard region 36 of a blade 22 generally extends radially outward from the root region 34 to a point on the blade 22 that is approximately eighty (80%) to ninety percent (90%) of the distance from the axis 26 to the tip 38. Finally, the tip region 32 extends radially outward from the outboard region 36 of blade 22 to the tip 38. For the previously given example airfoils 27, 28, 29, the airfoil 27 is located in the root region 34 of the blade 22, the airfoil 28 is located in the outboard or midspan region 36 of the blade 22, and the airfoil 29 is located in the tip region 32 of the blade 22. In the following discussion, the airfoils 27, 28, 29 may be considered an airfoil family having three airfoils, e.g., a root airfoil, an outboard airfoil, and a tip airfoil. Exemplary locations of each of the three airfoils are provided in terms of blade radial stations, e.g., the distance from the inboard edge or end of the blade to the airfoil measured along the longitudinal axis of the blade divided by the length of the blade.

Each of the airfoils 27, 28, 29 has a leading edge 33 and a trailing edge 35. Also, as mentioned above, each airfoil has a maximum thickness that is expressed conventionally as a percent (%) of the chord 48 length, which is the straight-line distance between the leading edge 33 and the trailing edge 35. In other words, the maximum thickness is understood to be the ratio of L to C expressed as a percent, where C is the length of the chord 48 and L is the length of the longest line 48" between the upper surface 43 and the lower surface 44 that is perpendicular to the chord 48. For example, an airfoil that has a maximum thickness of 21% is one in which the length L of the longest perpendicular line 48" is 21% of the length C of the chord 48.

As discussed above, the shape, contour, and length of the airfoils of a blade 22 are determining factors in the efficiency and power production capabilities of the wind turbine 20. The shape of a blade 22 is preferably, but not necessarily, defined by a minimum of three airfoils or an airfoil family of the blade 22, one airfoil (for example, airfoil 27) located in the root region 34 of the blade 22, one airfoil (for example, airfoil 28) located in the mid-span region 36 of the blade 22, and one airfoil (for example, airfoil 29) located in the tip region 32 of the blade 22. The shapes of the airfoils (not illustrated specifically) located between the root region 34 airfoil 27 and the mid-span region 36 airfoil 28 form preferably smooth transitions between the defining airfoils 27, 28 and can be determined by interpolation between the shapes of the two defining airfoils 27, 28, as is well known to persons having ordinary skill in this art. Similarly, the shapes of the airfoils (not illustrated specifically) located between the mid-span region 36 airfoil 28 and the tip-region 32 airfoil 29 form preferably smooth transitions between the defining airfoils 28, 29 and can be determined by an interpolation between the shapes of the two defining airfoils 28, 29.

Figure 3:
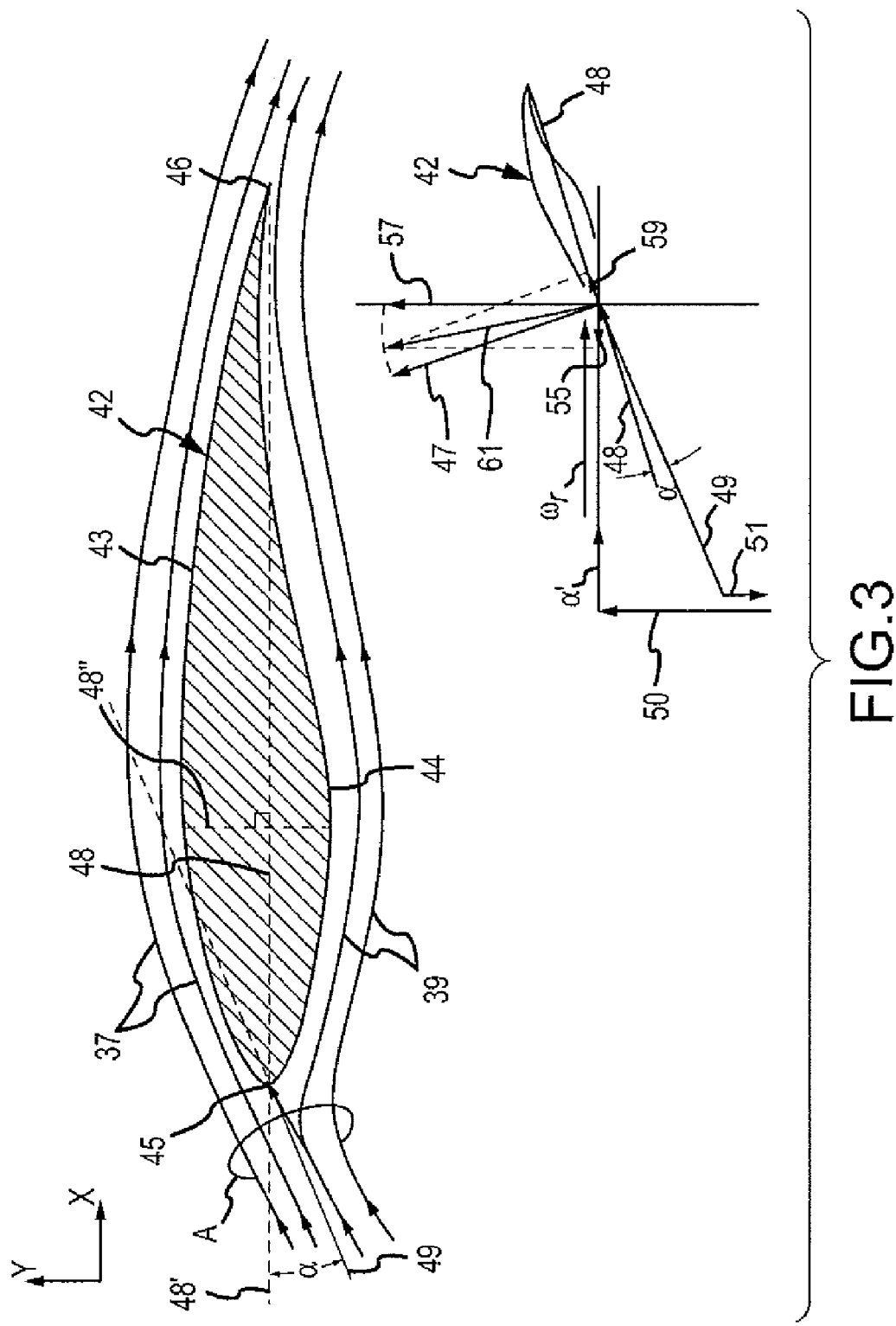
FIG. 3 is an airfoil or cross-section of a blade, such as the blades of the turbine in FIG. 1 illustrating flow of air along the upper or suction side of the airfoil and along the lower or pressure side of the airfoil.

An important characteristic of any conventional wind turbine blade is its ability to create lift, which imparts force components to the blades 22 that cause the blades 22 of a wind turbine to rotate about the axis 26. Since a wind turbine blade includes and is defined by its multiple airfoils, the concept of lift of a turbine blade can be discussed by reference to one of the blade's airfoils, recognizing that lift at any particular airfoil in the blade depends on the particular geometric characteristics of such airfoil and that the lift of the entire blade is an integration of the lifts of all the airfoils in the blade. Referring to FIG. 3, when a flowing stream of air A encounters the leading edge 45 of an example airfoil 42 (which may be representative of one of the airfoils 27, 28, or 29) of a turbine blade 22, part 37 of the air flow A passes above the airfoil 42 and flows along the upper surface or suction side 43 of the airfoil 42, while part 39 of the air flow A passes below the airfoil 42 and flows along the lower surface or pressure side 44 of the airfoil 42. The upper part 37 of air flow A and the lower part 39 of airflow A recombine at the trailing edge 46 of the airfoil 42. The air 37 flowing along the upper surface 43 of the airfoil 42 will travel at a higher average velocity than the air 39 flowing along the lower surface 44 of the airfoil 42 causing a lower pressure on the upper surface 43 of the airfoil 42 than the pressure on the lower surface 44 of the airfoil 42 according to Bernoulli's Principle. The difference in pressure against the upper surface 43 and the lower surface 44 of the airfoil 42 creates a lift force, as medicated by the vector 47 in the force vector diagram in FIG. 3, which has both a torque component 55 and a thrust component 57. The lift force components acting on blades 22 in a wind turbine 20 cause the blades 22, the hub 24, and the shaft 25 to rotate about the axis 26.

The magnitude of an airfoil's lift is dependent on many factors, including the velocity of the air flow A incident on the airfoil, the shape and contour of the airfoil, and the airfoil's angle of attack. The angle of attack of an airfoil varies and is defined as the angle between the imaginary straight line or chord line extending from the airfoil's leading edge to the airfoil's trailing edge and a specific vector. The vector is the resultant vector created as a combination of the airfoil's rotational speed vector, wind speed vector, and blade induced velocity vectors. For example, for the airfoil 42 shown in FIG. 3, the angle of attack $\alpha$ is the angle between a straight-line extension 48' of the chord line 48 and the resultant flow vector 49.

The resultant flow vector 49 is indicative of the speed and direction of the air flow A in the x-y plane at the leading edge 45 of the airfoil 42 and is a result of the combination of: (i) the rotational speed vector $\omega_r$, which is indicative of the rotational speed of the blade 22 that contains the airfoil 42; (ii) the swirl vector, which is induced by the wake of the turbine 20 and is in the same direction as the rotational speed vector $\omega_r$; (iii) the wind speed vector 50; and (iv) the blade induced velocity vector 51, which is in a direction opposite the wind speed vector 50 and is also induced by the wake of the turbine 20 containing the airfoil 42. For any given blade 22, an airfoil 29 in the tip region 32 of the blade 22 will have a higher rotational speed than an airfoil 27 in the root region 34 or in the outboard region 36 of the same blade 22. Likewise, an airfoil 28 in the outboard region 36 of a blade 22 will have a higher rotational speed than an airfoil in the root region 34 of the same blade 22.

In a stall regulated wind turbine, the angular speed of the wind turbine is held constant, despite an increase or decrease in wind speed so that concomitantly, the rotational velocity of a particular airfoil 35 also remains constant. As a result, the angle of attack α for airfoils 42 in a stall regulated wind turbine increases automatically as the wind speed and the resulting flow vector 49 increase in magnitude. In a variable speed wind turbine, the angular velocity of the wind turbine increases proportionately as the wind speed increases so that the rotational speed of an airfoil 42 in the rotating blade 22 also increases in proportion to wind speed increases. Therefore, the resulting flow vector 49 increases such that the angle of attack α for airfoils in the variable speed wind turbine remains constant, despite changes in wind speed. The lift force vector 47 is perpendicular to the resultant flow vector 49 and contains a torque component 55 and a thrust component 57. The torque component 55 is the most important of these components, since the torque component 55 is the primary contributor to the generation of power by the wind turbine 20. A drag vector 59 may reduce the torque component 55 of the lift force vector 47 and create the net force vector 61. In addition, the drag vector 59 may add to the thrust component 57 of the lift force vector 47, depending on the orientation of the airfoil 42.

The lift coefficient of an airfoil is a convention adopted to allow all of the factors of an airfoil's shape to be summed up in a non-dimensional figure. A lift coefficient of 1.5 indicates more lifting effect of an airfoil than a lift coefficient of 1.0. A lift coefficient of zero indicates no lifting effect at all. The lift coefficient does not have any dimensions and is a dimensionless number used for rotor performance prediction and comparison purposes. An airfoil's lift coefficient is proportional to the airfoil's angle of attack up to the point of stall of the airfoil.

As previously mentioned above, one unique feature of the airfoils 42 is that they are designed to be quiet (i.e., have low noise) and to be largely insensitive to roughness effects, which is caused when the blades 22 become soiled with accumulated insects, airborne pollutants, and other particles that impact and stick to the blade 22. Roughness on an airfoil reduces the maximum lift coefficient of the airfoil and, as a result, the amount of electric power or energy produced by the wind turbine system 20. More specifically, a general performance characteristic for each of the airfoils 42 is that it exhibits a maximum lift coefficient $c_{l,max}$ that is relatively insensitive to roughness effects.

The ability of the airfoils 42 to have a maximum lift coefficient that is largely insensitive to roughness effects is accomplished through geometric tailoring of the airfoil shapes to force a transition from laminar flow to turbulent flow on the upper surfaces of the airfoils 42 (i.e., on the suction side of the airfoils) as the maximum lift coefficient is approached and, more specifically, by ensuring that the transitions from laminar flow to turbulent (low on the upper surfaces of the airfoils 42 occurs very near the leading edge 45 of the airfoil 42 (i.e., such that all or nearly all of the blade experiences turbulent flow) just prior to the airfoil 42 reaching its maximum lift coefficient, as will now be discussed in more detail.

The flow of air around an airfoil is either laminar, turbulent, or separated. Whether laminar flow of air or turbulent flow of air occurs at a given point on an airfoil depends on, among other things, the airfoil's shape, the airfoil's angle of attack, the airfoil's surface roughness, the speed of the airflow along the surfaces of the airfoil, and the density and viscosity of the air. In laminar flow of air along surfaces of an airfoil, the air moves in a very smooth fashion, creating layers of air sliding past the airfoil's surfaces. The lowest air laminas or layers close to the surface of the airfoil are moving noticeably faster than the free stream. Each air lamina or layer slides smoothly over the adjacent air lamina. The distinct sheets or laminas continue until an outermost lamina is reached which is moving at almost the speed of the external flow. The laminar layers nearest the airfoil's surfaces move fast in comparison to the laminar layers farthest away from the airfoil's surfaces. The smooth movement of the laminar layers nearest the airfoil's surfaces reduces friction effects on the airfoil's surfaces. In addition, there is little, if any, movement of air across or from one laminar layer to another.

In a turbulent flow of air along an airfoil, there is not a tidy system of sliding layers as is typical in laminar flow. Rather, air particles move with a great amount of freedom, up, down, forward as well as in the general direction of the air flow from the leading edge 45 of the airfoil 42 to the trailing edge 46 of the airfoil 42. A turbulent flow of air along an airfoil can undesirably increase the friction effects on the airfoil's surfaces, thereby reducing the lift coefficient for the airfoil and increasing the airfoil's drag. For many conventional airfoils, the flow of air along the airfoil's upper surface is laminar near the leading edge of the airfoil and turbulent near the trailing edge of the airfoil. Referring to FIG. 4, the air flow A for the example airfoil 42 is laminar along the upper surface 43 near the leading edge 45 and turbulent along the upper surface 43 near the trailing edge 46. The transition from laminar flow to turbulent flow occurs through a separation bubble 52, which lies along the upper surface 43 of the airfoil 42 with the turbulent flow 53 extending from the transition bubble 52 to the trailing edge 46 of the airfoil 42. The transition bubble 52 is an area of circulating, air (as indicated by the arrow C) on the upper surface 43 of the airfoil 42. A similar flow pattern is found on the airfoil's lower surface or pressure surface.

Most conventional airfoils operate with the position of the transition bubble on the upper surface of the airfoil well aft of the leading edge of the airfoil at all angles of attack. Therefore, the air flow 37 along the upper surface 43 of the airfoil between the leading edge 45 of the airfoil and the transition bubble 52 is intended to be primarily laminar. Roughness on the upper surface 43 of the airfoil will result in the transition from laminar to turbulent flow to move closer to the leading edge 45, thereby reducing the lift coefficient of the airfoil. The airfoils may also contain a separation bubble located on the lower surface of the airfoil such as, for example, the separation bubble 52' located on the lower surface 44 of the airfoil 42 which creates turbulent flow 53' on the lower surface 44 of the airfoil 42. Separation bubbles on the lower surface of an airfoil are not generally significant with regard to the airfoil's roughness sensitivity, since usually about two-thirds of an airfoil's lift comes from the suction side or upper surface side of the airfoil.

As previously discussed, the lift coefficient for an airfoil increases as its angle of attack increases. Therefore, for most conventional airfoils, as the airfoil's angle of attack increases, the airfoil's lift coefficient increases and approaches the airfoil's maximum lift coefficient. Since roughness on the airfoil's upper surface will cause turbulent air flow along the upper surface of the airfoil, an airfoil that normally has laminar flow in this upper surface region may suffer from turbulent air flow in this upper surface region created by the surface roughness. The turbulent air flow will decrease the airfoil's lift coefficient, thereby making the maximum lift coefficient of the airfoil sensitive to roughness on the airfoil's upper surface.

The airfoils are designed so that the transition bubble 52 located on the upper surface 43 of the airfoil moves toward the leading edge of the airfoil just prior to the airfoil obtaining its maximum lift coefficient as the airfoil's angle of attack increases, thereby minimizing the effects of roughness on the maximum lift coefficient of the airfoil. The movement and change in size of the transition bubble 52 along the top surface of the airfoil toward the leading edge of the airfoil is a result of changes in pressure distributed along the top surface of the airfoil. In the example airfoil 42 illustrated in FIG. 4, the transition bubble 52 positioned on the upper surface 43 will move rapidly toward the leading edge 45 of the airfoil 42 as the airfoil's 42 maximum lift coefficient is approached. Therefore, there is no laminar flow of air along the top surface 43 of the airfoil 42 just prior to the airfoil 42 reaching its maximum lift coefficient. As a result, a maximum lift coefficient for the airfoil 42 is obtained that is relatively insensitive to roughness effects when compared to conventional airfoils. Since the flow of air along the upper surface 43 of the airfoil 42 at high angles of attack is already turbulent due to the shifting of the position of the transition bubble 50 on the upper surface 43 of the airfoil 42, roughness on the upper surface 43 of the airfoil 42 cannot increase the turbulence of the airflow along the upper surface 43 of the airfoil 42 significantly. The separation bubble 52' located on the lower surface 44 of the airfoil 42 may move slightly aft toward the trailing edge 46 of the airfoil 42, as previously discussed above, but the movement of the separation bubble 52' does not significantly effect the roughness sensitivity of the airfoil 42. Note, the blades 22 can be made of fiberglass, wood, a suitable composite material or any other material that can withstand the forces and environmental conditions encountered.

Building on this general understanding of wind turbines, blades, and airfoil families, a detailed discussion is provided for the selection and configuration of a representative family of airfoils for large wind turbines, i.e., blade lengths between about 20 and 50 meters, and of a representative family of airfoils for small wind turbines, i.e., blade lengths between about 0.5 and 5 meters. The airfoil families both include three airfoils which are positioned along the length of the blade at blade radial stations but in some cases, may be thought of as root, outboard, and tip region airfoils useful for defining a wind turbine blade (with interpolation between the airfoils and extension inboard and outboard from the root and tip airfoil, respectively, defining the other portions of the blade). As will become clear, the airfoil families were selected to control or even minimize the thickness of the boundary layer on the suction side of the large and small blades, which significantly reduces noise generated by the blades during operation. Further, the airfoils were selected utilizing high Reynolds numbers and with high maximum lift coefficients. Yet further, the airfoils are selected such that blades constructed using the airfoils are less sensitive to roughness because the airfoils provide a transition from laminar flow to turbulent flow over all or nearly all of the blade's suction surfaces at or just before the maximum lift coefficient.

Airfoil Family Example for Large Wind Turbine Blades

A family of quiet, thick, natural-laminar-flow airfoils, labeled the S830, S831, and S832 in some of the following figures and tables, was designed by the inventors for blades about 20 to 50 meters in length. The airfoils are particularly well-suited for use with variable speed/variable pitch, horizontal-axis wind turbines. Exemplary objectives achieved in designing the airfoil family include high maximum lift, relative insensitivity to roughness, and low profile drag. The airfoils also exhibit docile stalls and provide desirable characteristics with regards to pitching moment and airfoil thicknesses (e.g., stiffness).

The aerodynamic noise produced by wind-turbine blades is generated primarily by the outboard portion of the blades, where the flow velocity is highest. This is due to the local flow velocity being proportional to the radius and the noise increasing by the fifth power of the flow velocity. The inventors also understood that the lift (i.e., lift coefficient times blade chord) produced by the outboard portion of the blade could be constrained to alleviate the noise. Accordingly, a decreasing, as opposed to increasing outboard, maximum lift coefficient is specified for the outer quarter of the blade in the airfoil families. In addition, the airfoils are configured such that thickness decreases rapidly toward the blade tip to reduce drag and the noise due to thickness. Specifications for the airfoils are shown in Table 1.

TABLE I

LARGE BLADE AIRFOIL DESIGN SPECIFICATIONS

| Parameter | Blade radial station (plus/minus 10% or 0.10) | | |
|---|---|---|---|
| | 0.75 | 0.90 | 1.00 |
| | Objective/Constraint | | |
| Reynolds number, R | $4.0 \times 10^6$ | $3.5 \times 10^6$ | $2.5 \times 10^6$ |
| Maximum lift coefficient, $c_{l,max}$ | 1.60 | 1.50 | 1.40 |
| Lower limit of low drag, lift coefficient range, $c_{l,ll}$ | 0.80 | 0.70 | 0.60 |
| Upper limit of low drag, lift coefficient range, $c_{l,ul}$ | 1.40 | 1.30 | 1.20 |
| Zero-lift pitching-moment coefficient, $c_{m,o}$ | | $\geq -0.15$ | |
| Airfoil thickness, t/c | 21% | 18% | 15% |

The family includes three airfoils, e.g., a primary, an intermediate, and a tip airfoil, corresponding to the 0.75, 0.90, and 1.00 blade radial stations, respectively, which may vary by at least about plus or minus 10 percent (e.g., the primary airfoil may be positioned at a station ranging from 0.65 to 0.85, the intermediate airfoil may be positioned at a station ranging from 0.80 to 1.00 or nearly 1.00, and the tip airfoil may be positioned at a station ranging from 0.9 to 1.00). An additional airfoil may be used for a root airfoil, i.e., an airfoil with a radial blade station less than about 0.50, or the primary airfoil may be extended inward from the 0.75 blade radial station. If a root airfoil is added to the family, it should be selected to have a suitable thickness, maximum lift coefficient, and Reynolds number for a large blade and for use with the other airfoils specified for this large blade family.

Two significant objectives are evident from the specifications in Table 1. The first objective is to achieve high maximum lift coefficients. Related to this objective is the desire that the maximum lift coefficients not decrease significantly with transition fixed near the leading edge on both surfaces. In addition, the airfoils preferably exhibit docile stall characteristics. The second objective is to obtain low profile drag coefficients over the specified ranges of lift coefficients. Additionally, the inventors imposed two major constraints on the design of these airfoils. First, the zero-lift pitching-moment coefficient was selected to be no more negative than −0.15. Second, the airfoil thicknesses were set to equal those specified in Table I. As can be seen from the specifications, the Reynolds numbers and airfoil thicknesses are higher for large blades.

Figure 5:
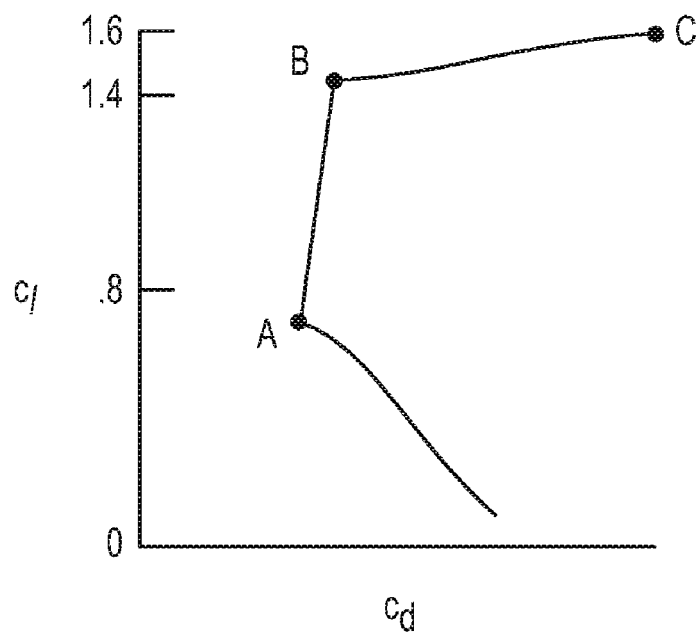
FIG. 5 is a graph of a lift/drag polar for an exemplary primary airfoil for large blades, such as that might be used in a large blade implementation of the turbine of FIG. 1.

FIG. 5 illustrates a lift/drag polar that meets the design objectives for the primary airfoil. The polars for the intermediate and tip airfoils should be qualitatively similar. The desired airfoil shape can be traced to the pressure distributions that occur at the various points in FIG. 5. Point A is the lower limit of the low-drag, lift-coefficient range. The lift coefficient at point A is lower than the objective specified in Table I. The difference is intended as a margin against such contingencies as manufacturing tolerances (e.g. variance is expected by the inventors from specific airfoil coordinates provided in this application such as 0 to 60 thousandths of an inch for larger blades and 0 to 40 thousandths of an inch for small blades with less variance over the outboard half of the blade such as near the tip), operational deviations, three-dimensional effects, and inaccuracies in the theoretical method. A similar margin is also desirable at the upper limit of the low-drag range, point B, although this margin is constrained by the proximity of the upper limit to the maximum lift coefficient. The profile drag coefficient at point B is not as low as at point A, unlike the polars of many laminar-flow airfoils where the drag coefficient within the laminar bucket is nearly constant. This characteristic is related to the mitigation of drag-producing and noise-producing laminar separation bubbles on the upper surface. The small increase in profile drag coefficient with increasing lift coefficient is relatively inconsequential because the ratio of the profile drag to the total drag of the wind-turbine blade decreases with increasing lift coefficient.

The profile drag coefficient increases very rapidly outside the low-drag range because boundary layer transition moves quickly toward the leading edge with increasing (or decreasing) lift coefficient. This feature results in a leading edge that produces a suction peak at higher lift coefficients, which ensures that transition on the upper surface will occur very near the leading edge. Thus, the maximum lift coefficient, point C, occurs with turbulent flow along the entire or nearly the entire upper surface and, therefore, should be relatively insensitive to roughness at the leading edge. Because the large thickness of the primary airfoil allows a wider low-drag range to be achieved than specified, the lower limit of the low drag range should be below point A.

Figure 6:
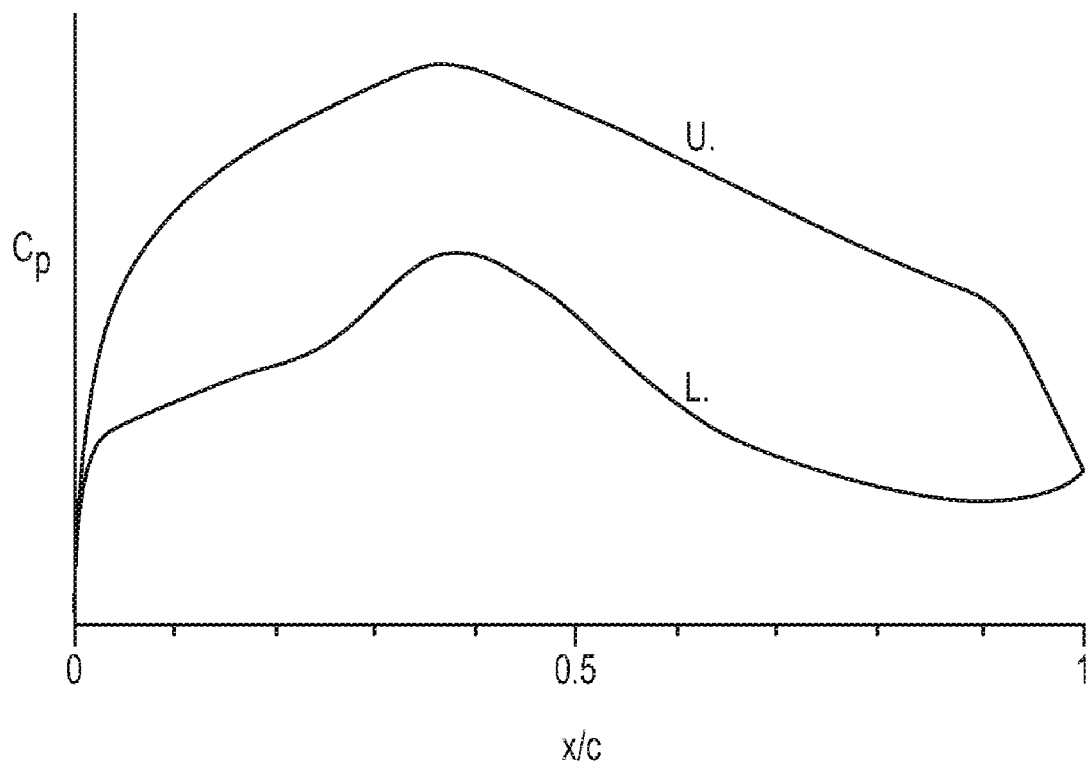
FIG. 6 illustrates a pressure distribution of Point A of FIG. 5 for an exemplary primary or midspan airfoil.

From the preceding discussion, the pressure distributions along the polar can be deduced. The predicted pressure distribution at point A for the primary airfoil are shown in FIG. 6. Again, the pressure distributions for the other airfoils should be qualitatively similar. To achieve low drag, a favorable pressure gradient is desirable along the upper surface to about 35-percent chord. Aft of this point, a short region having a shallow, adverse pressure gradient ("transition ramp") promotes the efficient transition from laminar to turbulent flow. The transition ramp is followed by a nearly linear pressure recovery. The pressure recovery begins farther forward than dictated by transition-free minimum-drag requirements to decrease the boundary-layer thickness and increase the skin-friction coefficient at the trailing edge with transition fixed, which reduces the noise due to the interaction between the turbulent boundary layer and the trailing edge, which is the primary airfoil dependent noise source for large wind turbines. Thus, the specific pressure recovery employed represents a compromise made by the inventors between maximum lift, drag, pitching moment, stall characteristics, and noise. The steep, adverse pressure gradient aft of about 90-percent chord is a "separation ramp," which confines turbulent separation to a small region near the trailing edge. By constraining the movement of the separation point at high angles of attack, high lift coefficients can be achieved with little drag penalty. This feature has the added benefit of initiating docile stall characteristics.

A favorable pressure gradient is desirable along the lower surface to about 40-percent chord to achieve low drag. The specific pressure gradients employed along the forward portion of the lower surface increase the loading in the leading-edge region while maintaining low drag at the lower lift coefficients. The forward loading serves to balance, with respect to the pitching-moment constraint, the aft loading, both of which contribute to the achievement of a high maximum lift coefficient and low profile-drag coefficients. This region is followed by a curved transition ramp and then, a concave pressure recovery, which exhibits lower drag and has less tendency to separate than the corresponding linear or convex pressure recovery. The pressure recovery preferably begins relatively far forward to alleviate separation at lower lift coefficients, especially with transition fixed near the leading edge. The amounts of pressure recovery on the upper and lower surfaces are determined by the airfoil-thickness and pitching-moment constraints.

Figure 7:
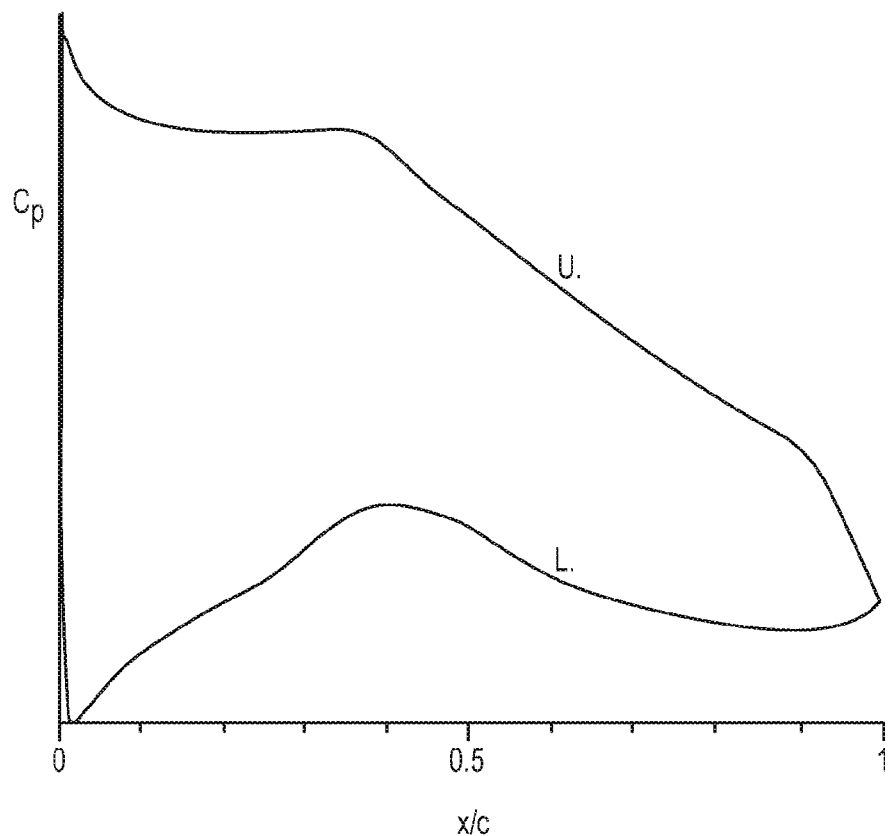
FIG. 7 illustrates a pressure distribution of Point B of FIG. 5 for an exemplary primary airfoil for a large blade airfoil family.

FIG. 7 illustrates the predicted pressure distribution at point B of FIG. 5. No suction spike exists at the leading edge. Instead, a rounded peak occurs just aft of the leading edge. Transition is essentially imminent over the entire forward portion of the upper surface. This feature allows a wider low-drag range to be achieved and higher lift coefficients to be reached without significant separation. It also causes transition to move very quickly toward the leading edge with increasing lift coefficient, which leads to the roughness insensitivity of the maximum lift coefficient. Mitigation of laminar separation bubbles, especially on the upper surface, was increasingly emphasized with increasing blade radial station, because of the increasing flow velocity and decreasing Reynolds number, to eliminate this possible noise source.

Figure 8:
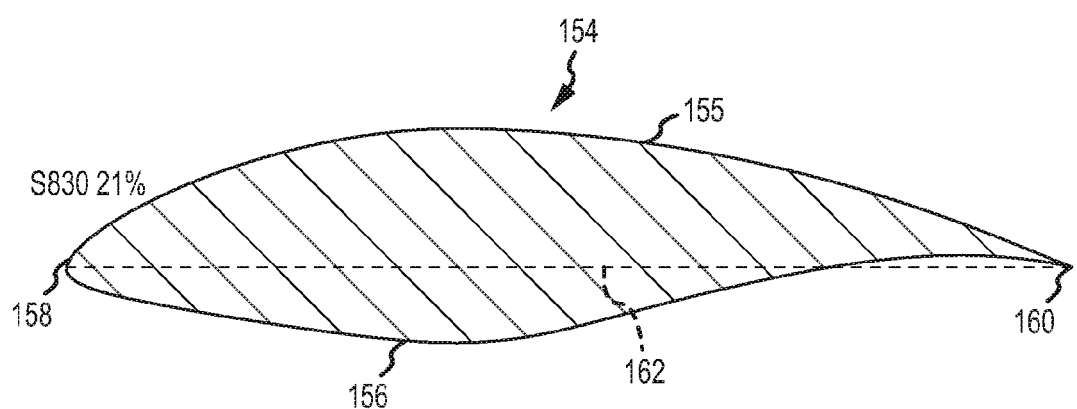
FIG. 8 is a cross-sectional view of a root or inboard airfoil of a large blade airfoil family, such as may be used to define a blade of the turbine of FIG. 1.
Figure 9:
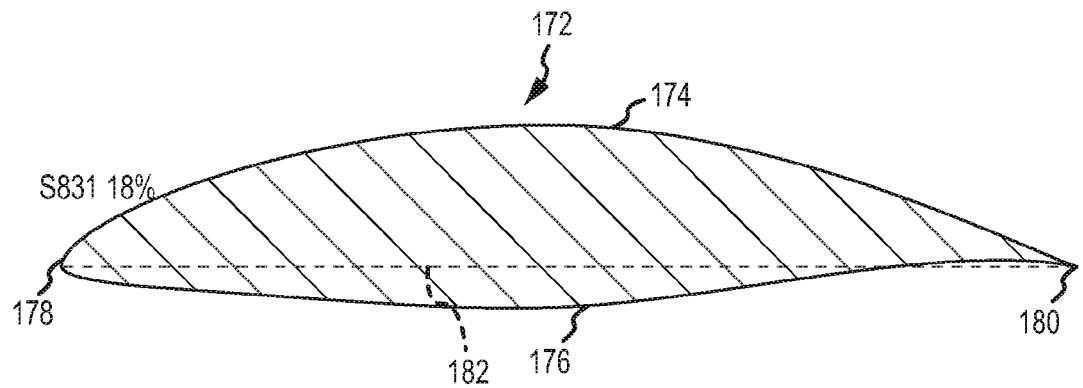
FIG. 9 is a cross-sectional view of an intermediary, midspan, or outboard airfoil of the exemplary large blade airfoil family.
Figure 10:
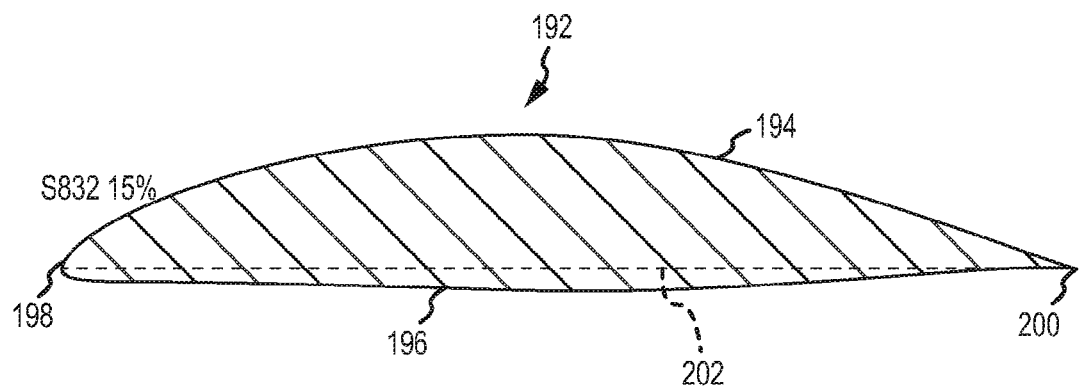
FIG. 10 is a cross-sectional view of a tip region airfoil of the exemplary large blade airfoil family.

The primary airfoil, which corresponds to the 0.75 blade radial station, is designated the "S830." The intermediate and tip airfoils, the "S831" and the "S832," which correspond to the 0.90 and 1.00 blade radial stations, respectively, were derived from the S830 airfoil to increase the aerodynamic and geometric compatibilities of the three airfoils. The airfoil shapes are shown in FIGS. 8, 9, and 10 and the coordinates are contained in tables II, III, and IV. The S830 airfoil thickness is 21-percent chord; the S831 airfoil thickness is 18-percent chord; and the S832 airfoil thickness is 15-percent chord. Generally, the section characteristics are predicted for Reynolds numbers of $1 \times 10^6$ to $9 \times 10^6$. Analysis computations were performed with transition free using transition mode 3, with transition fixed at 2-percent chord on the upper surface and 5-percent chord on the lower surface using transition mode 1, and "rough" using transition mode 9, which simulates distributed roughness due to, for example, leading-edge contamination by water drops or insects. Because the freestream Mach number for all relevant wind-turbine operating conditions remains below 0.3, all results are incompressible.

The S830 Airfoil

Referring to FIG. 8, airfoil 154 (i.e., the S830 airfoil) is shown as it was designed in accordance with this description. The airfoil 154 may be considered a representative example of airfoil 27 in the root region 34 of a blade 22, as was illustrated in FIG. 2, but more typically, the airfoil 154 is located preferably on a blade 22 at blade radial station 0.75 (or in the blade radial station range of 0.65 to 0.85), i.e., at a distance away from the axis of rotation 26 that is approximately seventy-five percent (75%) of the length of the blade 22. The airfoil 154 has specific geometric tailoring to achieve a maximum lift coefficient of 1.6 for a design Reynolds number of about 4,000,000. The example airfoil 154 includes the upper surface 155 and the lower surface 156 extending between the leading edge 158 and the trailing edge 160. The chord line 162 is formed between the leading edge 158 and the trailing edge 160. The airfoil 154 is designed to be the inner most or inboard airfoil of the large blade airfoil family. The airfoil 54 also has a maximum thickness of approximately twenty-one percent (21%) of the length of the chord 162.

The specific example shape or contour of the airfoil 154 according to this description is given in Table II below in the form of dimensionless coordinates x/c and y/c, so that they define the airfoil shape and contour, regardless of whatever the overall size or chord length c of the airfoil may be. The dimensionless x/c values are ratios of respective distances x between the leading edge 158 and respective reference points on the chord line 162 to the length c of the chord 162. The dimensionless y/c values are ratios of respective heights y from the chord line 162 to respective points either on the upper surface 155 or the lower surface 156 of the airfoil 154. In one part of Table II, corresponding y/c coordinate values are given for respective x/c coordinate values to define the shape and contours of the upper surface 155 in relation to the chord line 162. Likewise, in another part of Table II, corresponding y/c coordinate values are given for respective x/c coordinate values to define the shape and contours of the lower surface 156 in relation to the chord line 62. Therefore, for any particular desired chord length c that may be chosen for an airfoil 154 with this shape and contour, the respective x and y coordinates for the upper surface 155 and for the lower surface 156 can be determined from the values in Table II to produce the airfoil 154 with this shape and contour, as will be understood by persons skilled in the art. Note that due to the high curvature or camber of the airfoil 154, the chord line 162 falls partially outside the airfoil 154. Therefore, some of the y/c coordinates for the lower surface in Table II are negative for the portion of the lower surface 156 of the airfoil 154 that is below the chord line 162, while others of the y/c coordinates for the lower surface in Table II are positive for the portion of the lower surface 156 of the airfoil 154 that is above the chord line 162.

TABLE II

S830 AIRFOIL COORDINATES

| Upper Surface | | Lower Surface | |
|---|---|---|---|
| x/c | y/c | x/c | y/c |
| 0.00006 | 0.00112 | | |
| .00321 | .01040 | | |
| .01104 | .02127 | 0.00004 | −0.00084 |
| .02343 | .03307 | .00041 | −.00254 |
| .04015 | .04540 | .00138 | −.00406 |
| .06101 | .05794 | .00288 | −.00560 |
| .08576 | .07041 | .01318 | −.01192 |
| .11413 | .08253 | .02942 | −.01794 |
| .14580 | .09406 | .05165 | −.02385 |
| .18042 | .10474 | .07932 | −.03013 |
| .21762 | .11434 | .11146 | −.03674 |
| .25699 | .12262 | .14756 | −.04351 |
| .29810 | .12934 | .18687 | −.05030 |
| .34048 | .13417 | .22887 | −.05701 |
| .38383 | .13653 | .27253 | −.06393 |
| .42854 | .13632 | .31589 | −.07002 |
| .47434 | .13395 | .35873 | −.07334 |
| .52084 | .12962 | .40193 | −.07288 |
| .56764 | .12354 | .44627 | −.06859 |
| .61431 | .11592 | .49216 | −.06086 |
| .66042 | .10703 | .53971 | −.04984 |
| .70550 | .09715 | .59018 | −.03645 |
| .74904 | .08657 | .64307 | −.02282 |

TABLE II-continued

S830 AIRFOIL COORDINATES

| Upper Surface | | Lower Surface | |
|---|---|---|---|
| x/c | y/c | x/c | y/c |
| .79053 | .07559 | .69724 | −.01029 |
| .82943 | .06449 | .75132 | .00013 |
| .86518 | .05352 | .80381 | .00775 |
| .89719 | .04283 | .85314 | .01212 |
| .92504 | .03222 | .89755 | .01296 |
| .94908 | .02179 | .93491 | .01083 |
| .96943 | .01245 | .96391 | .00721 |
| .98554 | .00533 | .98422 | .00357 |
| .99621 | .00120 | .99611 | .00096 |
| 1.00000 | .00000 | 1.00000 | .00000 |

Regarding pressure distributions for the S830 airfoil, the transition location was defined, for analysis purposes, as the end of the laminar boundary layer whether clue to natural transition or laminar separation. Transition is normally confirmed in experiments, however, by the detection of an attached turbulent boundary layer. Thus, for conditions that result in relatively long laminar separation bubbles (low lift coefficients for the upper surface, high lift coefficients for the lower surface, and low Reynolds numbers), the apparent agreement between the theoretical and experimental transition locations was poor. However, the difference between the predicted and measured transition locations represents the length of the laminar separation bubble (from laminar separation to turbulent reattachment). Accordingly, for conditions that result in shorter laminar separation bubbles (high lift coefficients for the upper surface, low lift coefficients for the lower surface, and high Reynolds numbers), the apparent agreement between theory and experiment improves.

The inventors determined variation of turbulent boundary-layer separation location with lift coefficient for the S830 airfoil, and determined that a small, trailing-edge separation is predicted on the upper surface at all lift coefficients. This separation, which is caused by the separation ramp, generally increases in length with transition fixed and rough. Separation is predicted on the lower surface at lift coefficients below the operating range for the intended application but such separation usually has little effect on the section characteristics. Regarding section characteristics and Reynolds number effects, an empirical criterion was applied to computed results, and this criterion assumed that the maximum lift coefficient is reached if the drag coefficient of the upper surface is greater than 0.01920, which is based on correlations with results for Reynolds numbers from $1 \times 10^6$ to $9 \times 10^6$. Thus, the maximum lift coefficient for the design Reynolds number of $4.0 \times 10^6$ is estimated to be 1.60, which meets the design objective.

Based on the variation of the upper surface separation location with lift coefficient, the stall characteristics are expected to be docile for the S830 airfoil. Low profile-drag coefficients are predicted over the range of lift coefficients from 0.27 to 1.33. Thus, the lower limit of the low-drag, lift-coefficient range is below the design objective of $c_{l,ll}=0.80$, although the upper limit of the low-drag range is also below the design objective of $c_{l,ul}=1.40$, primarily to meet other, more important goals. The zero-lift pitching-moment coefficient is predicted to be −0.18, which exceeds the design constraint of $c_{m,0}>-0.15$. Because of boundary layer displacement effects not accounted for in the present analysis, the pitching-moment coefficient is generally over predicted by about 20 percent. Therefore, the actual zero-lift pitching-moment coefficient should be about −0.15, which satisfies the design constraint.

Regarding the effect of roughness on the section characteristics of the S830 airfoil, the maximum lift coefficient for the design Reynolds number of $4.0\times10^6$ is unaffected by fixing transition because transition on the upper surface is predicted to occur forward of 2-percent chord at the maximum lift coefficient. For the rough condition, the maximum lift coefficient for the design Reynolds number is estimated to be 1.57, a reduction of 2 percent from that with transition free. Thus, this design goal has been satisfied, and the effect of roughness on the maximum lift coefficient decreases with increasing Reynolds number. Of course, the drag coefficients are adversely affected by the roughness.

The S831 Airfoil

Referring to FIG. 9, an example airfoil 172 (i.e., the S831 airfoil) is shown as designed in accordance with this description. The airfoil 172 may be useful for exemplary airfoil 28 for an outboard region 36 or at least as an intermediary airfoil in an airfoil family defining a blade (such as a large blade) 22 of FIG. 2. More specifically, the airfoil 172 illustrated in FIG. 9 is preferably located on a blade 22 at blade radial station 0.90 (or in a blade radial station range of 0.80 to 1.0), i.e., at a distance away from the axis of rotation 26 that is approximately ninety percent (90%) of the length of the blade 22. The airfoil 172 has specific geometric tailoring to achieve a maximum lift coefficient at about 1.5 for a Reynolds number in a range between 3,500,000 or larger.

The airfoil 172 includes the upper surface 174 and the lower surface 176 with the leading edge 178 and the trailing edge 180. The chord line 182 is formed between the leading edge 178 and the trailing edge 180. The airfoil 172 also has a maximum thickness of approximately eighteen percent (18%) of the length of the chord 182.

The specific shape or contour of the airfoil 172 is given in Table III in the form of dimensionless coordinates in the same manner as explained above for the S830 airfoil. Briefly, though, the x/c values represent locations on the chord line 182 in relation to the leading edge 178. The y/c values represent heights from the chord line 182 to points either on the upper surface 174 or the lower surface 176 of the airfoil 172. The x/c and y/c values are given for both the upper surface 174 and the lower surface 176 of the airfoil 172 in Table III in a similar manner as explained above for Table II.

TABLE III

S831 AIRFOIL COORDINATES

| Upper Surface | | Lower Surface | |
|---|---|---|---|
| x/c | y/c | x/c | y/c |
| 0.00004 | 0.00088 | 0.00004 | −0.00080 |
| .00036 | .00277 | .00017 | −.00155 |
| .00449 | .01168 | .00041 | −.00221 |
| .01307 | .02201 | .00080 | −.00281 |
| .02606 | .03319 | .00134 | −.00340 |
| .04333 | .04479 | .00280 | −.00458 |
| .06483 | .05655 | .00966 | −.00795 |
| .09031 | .06828 | .02422 | −.01170 |
| .11951 | .07975 | .04525 | −.01480 |
| .15212 | .09077 | .07229 | −.01796 |
| .18776 | .10113 | .10441 | −.02131 |
| .22608 | .11064 | .14105 | −.02479 |
| .26663 | .11912 | .18146 | −.02831 |
| .30899 | .12638 | .22509 | −.03171 |
| .35269 | .13226 | .27122 | −.03485 |
| .39728 | .13659 | .31929 | −.03752 |

TABLE III-continued

S831 AIRFOIL COORDINATES

| Upper Surface | | Lower Surface | |
|---|---|---|---|
| x/c | y/c | x/c | y/c |
| .44223 | .13917 | .36859 | −.03951 |
| .48707 | .13978 | .41855 | −.04054 |
| .53137 | .13799 | .46850 | −.04013 |
| .57522 | .13349 | .51847 | −.03767 |
| .61871 | .12640 | .56861 | −.03326 |
| .66185 | .11707 | .61888 | −.02718 |
| .70445 | .10608 | .66924 | −.01993 |
| .74609 | .09394 | .71934 | −.01226 |
| .78632 | .08116 | .76865 | −00492 |
| .82460 | .06818 | .81639 | .00118 |
| .86035 | .05544 | .86130 | .00530 |
| .89294 | .04327 | .90193 | .00707 |
| .92180 | .03167 | .93666 | .00668 |
| .94699 | .02083 | .96429 | .00489 |
| .96834 | .01157 | .98416 | .00263 |
| .98514 | .00481 | .99606 | .00077 |
| .99614 | .00105 | 1.00000 | .00000 |
| 1.00000 | .00000 | | |

Regarding pressure distributions for the S831 airfoil, the variations of transition and separation locations with lift coefficient for the S831 airfoil were determined and a small, trailing-edge separation is predicted on the upper surface at all lift coefficients. This separation, which is caused by the separation ramp, generally increases in length with transition fixed and rough. Regarding section characteristics and Reynolds number effects, using the previously described criterion, the maximum lift coefficient for the design Reynolds number of $3.5\times10^6$ was estimated to be 1.50, which meets the design objective. The stall characteristics are expected to be docile, which meets the design goal. Low drag coefficients are predicted over the range of lift coefficients from 0.50 to 1.23. Thus, the lower limit of the low-drag range is below the design objective of $c_{l,l1}$=0.70, although the upper limit is also below the design objective of $c_{l,l1}$=1.30, primarily to meet other important goals. The zero-lift pitching-moment coefficient is predicted to be −0.17, which exceeds the design constraint of $c_{m,0} \geq$ −0.15, although the actual zero-lift pitching-moment coefficient should be about −0.14, which satisfies the constraint. Regarding the effect of roughness on the section characteristics for the S831 airfoil, the maximum lift coefficient for the design Reynolds number of $3.5\times10^6$ is unaffected by fixing transition because transition on the upper surface is predicted to occur forward of 2-percent chord at the maximum lift coefficient. For the rough condition, the maximum lift coefficient for the design Reynolds number is estimated to be 1.48, a reduction of 1 percent from that with transition free. Thus, the design requirement has been satisfied. The effect, of roughness on the maximum lift coefficient generally decreases with increasing Reynolds number. Again, the drag coefficients are, of course, adversely affected by the roughness.

The S832 Airfoil

Referring to FIG. 10, an example airfoil 192 (i.e., the S832 airfoil) is shown as designed in accordance with this description. The airfoil 192 may be useful for exemplary airfoil 29 for a tip region 32. More specifically, the airfoil 192 illustrated in FIG. 10 is located preferably on a blade 22 at a blade radial station of 1.00 (or between about 0.9 and 1.00. i.e., at a distance away from the axis of rotation 26 that is approximately 100 percent (100%) of the length of the blade 22. The airfoil 192 has specific geometric tailoring to achieve a maximum lift coefficient of approximately 1.4 for a Reynolds number of approximately 2,500,000. The airfoil 192 includes the upper surface 194 and the lower surface 196 with the leading edge 198 and the trailing edge 200. The chord line 202 is formed between the leading edge 198 and the trailing edge 200. The airfoil 192 is designed for the tip region 32 of blades for large blades (such as those greater the 20 meters in length and often greater than 40 meters in length). The airfoil 192 also has a maximum thickness of approximately fifteen percent (15%) for the length of the chord 202.

The specific shape or contour of the airfoil 192 is given in Table IV in the form of dimensionless coordinates in the same manner as explained above for the S830 airfoil. Briefly, though, the x/c values represent locations on the length of chord line 202 in relation to the leading edge 19S. The y/c values represent heights from the chord line 202 to points either on the upper surface 194 or the lower surface 196 of the airfoil 192. The x/c and y/c values are given for both the upper surface 194 and the lower surface 196 of the airfoil 192 in Table IV in a similar manner as explained above for Table II.

TABLE IV

S832 AIRFOIL COORDINATES

| Upper Surface | | Lower Surface | |
| --- | --- | --- | --- |
| x/c | y/c | x/c | y/c |
| 0.00000 | 0.00028 | 0.00010 | −0.00126 |
| .00011 | .00150 | .00026 | −.00194 |
| .00328 | .00973 | .00053 | −.00252 |
| .01071 | .01942 | .00094 | −.00303 |
| .02242 | .03000 | .00150 | −.00353 |
| .03830 | .04102 | .00188 | −.00380 |
| .05831 | .05217 | .00298 | −.00448 |
| .08228 | .06320 | .01074 | −.00728 |
| .11007 | .07390 | .02577 | −.00958 |
| .14137 | .08415 | .04734 | −.01088 |
| .17583 | .09376 | .07510 | −.01192 |
| .21310 | .10256 | .10825 | −.01295 |
| .25274 | .11037 | .14628 | −.01404 |
| .29436 | .11701 | .18846 | −.01522 |
| .33747 | .12233 | .23423 | −.01649 |
| .38161 | .12614 | .28287 | −.01779 |
| .42629 | .12824 | .33377 | −.01907 |
| .47106 | .12830 | .38622 | −.02025 |
| .51577 | .12599 | .43959 | −.02122 |
| .56040 | .12129 | .49317 | −.02188 |
| .60480 | .11436 | .54634 | −.02208 |
| .64882 | .10544 | .59843 | −.02158 |
| .69229 | .09486 | .64911 | −.02005 |
| .73496 | .08312 | .69821 | −.01745 |
| .77642 | .07079 | .74555 | −.01394 |
| .81614 | .05839 | .79090 | −.00991 |
| .85352 | .04638 | .83384 | −.00585 |
| .88788 | .03517 | .87378 | −.00234 |
| .91858 | .02488 | .90980 | .00013 |
| .94539 | .01576 | .94089 | .00144 |
| .96785 | .00839 | .96613 | .00169 |
| .98514 | .00333 | .98476 | .00118 |
| .99619 | .00069 | .99616 | .00041 |
| 1.00000 | .00000 | 1.00000 | .00000 |

Regarding transition and separation locations for the S832 airfoil, the variations of transition and separation locations with lift coefficient were determined, and a small, trailing-edge separation is predicted on the upper surface at almost all lift coefficients. This separation, which is caused by the separation ramp, generally increases in length with transition fixed and rough. The section characteristics of the S832 airfoil were tabulated and using the previously described criterion, the maximum lift coefficient for the design Reynolds number of $2.5 \times 10^6$ is estimated to be 1.40, which meets the design objective. The stall characteristics are expected to be docile, which meets the design goal. Low drag coefficients are predicted over the range of lift coefficients from 0.52 to 1.12. Thus, the lower limit of the low-drag range is below the design objective of $c_{l,l1}=0.60$, although the upper limit is also below the design objective of $c_{l,u1}=1.20$, primarily to meet other, more important goals. The zero-lift pitching-moment coefficient is predicted to be −0.12, which satisfies the design constraint. The actual zero-lift pitching-moment coefficient should be about −0.10. Regarding the effect of roughness on the section characteristics of the S832 airfoil, the maximum lift coefficient for the design Reynolds number of $2.5 \times 10^6$ is unaffected by fixing transition because transition on the upper surface is predicted to occur forward of 2-percent chord at the maximum lift coefficient. The maximum lift coefficient for the design Reynolds number is also unaffected by the rough condition. Thus, the design requirement has been satisfied. The effect of roughness on the maximum lift coefficient generally decreases with increasing Reynolds number and the drag coefficients are, of course, adversely affected by the roughness.

As can be seen from the above discussion, a family of quiet, thick, natural-laminar-flow airfoils, i.e., the S830, S831, and S832 airfoils, is provided for 40 to 50 meter-diameter (and other large blade turbines such as those with 20 to 50 meter blades), variable-speed/variable-pitch, horizontal-axis wind turbines. The airfoil family has been analyzed theoretically by the inventors, and it was determined that two primary objectives of high maximum lift coefficients, relatively insensitive to leading-edge roughness, and low profile-drag coefficients are achieved with the airfoils defined above and particularly by the coordinates of Tables II, III, and IV (which, as explained above, may vary due to manufacturing tolerances and manufacturing limitations, e.g., variances of up to 60 thousandths of an inch may be expected (especially in the root region) and these variances are considered to be part of the defining coordinates and the concepts described herein are believed to be broad enough to cover deviations of these magnitudes from the airfoil coordinates provided in this description). The airfoils in this large blade family should exhibit docile stall characteristics during operation. Additionally, the constraints on the zero-lift pitching-moment coefficient and the airfoil thicknesses are believed satisfied.

Airfoil Family Example for Small (0.5 to 5 Meter) Wind Turbine Blades

A family of quiet, thick, natural-laminar-flow airfoils, labeled the S833, S834, and S835 in some of the following figures and tables, was designed by the inventors for blades about 0.5 to 5 meters in length. The airfoils are particularly well-suited for use with variable speed/variable pitch, constant speed/stall regulated, horizontal-axis wind turbines. Exemplary objectives achieved in designing the airfoil family include high maximum lift, relative insensitivity to roughness, and low profile drag. The airfoils also exhibit docile stalls and provide desirable characteristics with regards to pitching moment and airfoil thicknesses (e.g., stiffness).

As discussed with reference to the airfoil family for large blades, the aerodynamic noise produced by wind-turbine blades is generated primarily by the outboard portion of the blades, where the flow velocity is highest. Research suggests that the lift (i.e., lift coefficient limes blade chord) produced by the outboard portion of the blade should be constrained to alleviate the noise. Accordingly, a decreasing, as opposed to increasing outboard, maximum lift coefficient is specified for this family of airfoils. In addition, the airfoil thickness is selected to decrease toward the blade tip to reduce the noise due to thickness. The small blade airfoil family specifications are contained in Table V. The family consists of three airfoils, primary, tip, and root, corresponding to the 075, 0.95, and 0.40 blade radial stations, respectively (again, plus or minus 10 percent or 0.1 to provide station ranges of 0.65 to 0.85, 0.85 to 1.00, and 0.30 to 0.50 for the three airfoils).

TABLE V

SMALL BLADE AIRFOIL FAMILY DESIGN SPECIFICATIONS

| Parameter | Blade radial station (plus/minus 0.1 or 10 percent) | | |
|---|---|---|---|
| | 0.75 | 0.95 | 0.40 |
| | Objective/Constraint | | |
| Reynolds number, R | $0.40 \times 10^6$ | $0.40 \times 10^6$ | $0.25 \times 10^6$ |
| Maximum lift coefficient, $c_{l,max}$ | 1.10 | 1.00 | 1.20 |
| Lower limit of low-drag, lift-coefficient range, $c_{l,ll}$ | 0.30 | 0.20 | 0.40 |
| Upper limit of low-drag, lift-coefficient range, $c_{l,ul}$ | 0.90 | 0.80 | 1.00 |
| Zero-lift pitching-moment coefficient, $c_{m,0}$ | | $\geq -0.15$ | |
| Airfoil thickness, t/c | 18% | 15% | 21% |

Two objectives are evident from these specifications. The first objective is to achieve high maximum lift coefficients. A requirement related to this objective is that the maximum lift coefficients not decrease significantly with transition fixed near the leading edge on both surfaces. In addition, the airfoils should exhibit docile stall characteristics. The second objective is to obtain low profile-drag coefficients over the specified ranges of lift coefficients. Additionally, the inventors placed two constraints on the design of these airfoils. First, the zero-lift pitching-moment coefficient was selected to be no more negative than –0.15. Second, the airfoil thicknesses were set or established as shown in Table V. As will be understood by those skilled in the art, the Reynolds numbers are lower than typically utilized in small blade airfoil designs.

Figure 11:
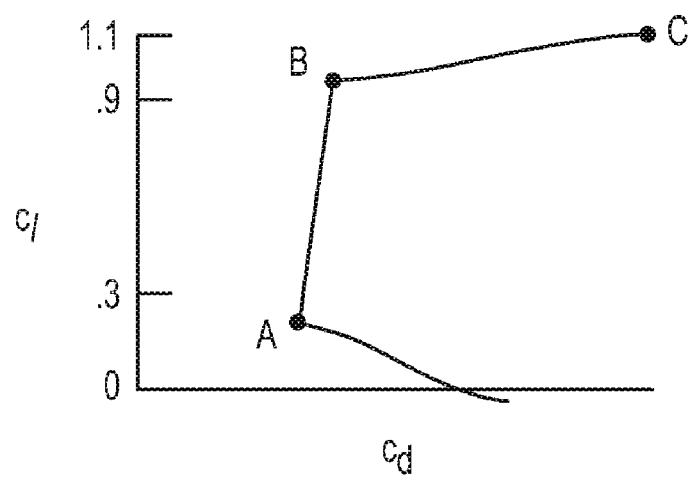
FIG. 11 is a graph of a lift/drag polar for an exemplary primary or outboard airfoil for small blades, such as that might be used in a small blade implementation of the turbine of FIG. 1.

FIG. 11 illustrates a drag polar that meets the goals for the primary or outboard airfoil. The polars for the tip and root airfoils should be qualitatively similar. The desired airfoil shape can be traced to the pressure distributions that occur at the various points in FIG. 11. Point A is the lower limit of the low-drag, lift-coefficient range. The lift coefficient at point A is lower than the objective specified in Table V. The difference is intended as a margin against such contingencies as manufacturing tolerances (which may be less than those experienced with larger blades such as 40 thousandths of an inch or less but, again, are considered included in the coordinate specifications of Tables VI, VII, and VIII), operational deviations, three-dimensional effects, and inaccuracies in the theoretical method. A similar margin is also desirable at the upper limit of the low-drag range, point B, although this margin is constrained by the proximity of the upper limit to the maximum lift coefficient.

The profile-drag coefficient at point B is not as low as at point A, unlike the polars of many laminar-flow airfoils where the drag coefficient within the laminar bucket is nearly constant. This characteristic is related to the mitigation of drag- and noise-producing laminar separation bubbles on the upper surface. The small increase in profile-drag coefficient with increasing lift coefficient is relatively inconsequential because the ratio of the profile drag to the total drag of the wind-turbine blade decreases with increasing lift coefficient. The profile-drag coefficient increases very rapidly outside the low-drag range because boundary-layer transition moves quickly toward the leading edge with increasing (or decreasing) lift coefficient. This feature results in a leading edge that produces a suction peak at higher lift coefficients, which ensures that transition on the upper surface will occur very near the leading edge. Thus, the maximum lift coefficient, point C, occurs with turbulent flow along the entire upper surface and, therefore, should be relatively insensitive to roughness at the leading edge. Note that, because the large thickness of the primary airfoil allows a wider low-drag range to be achieved than specified, the lower limit of the low-drag range should be below point A.

Figure 12:
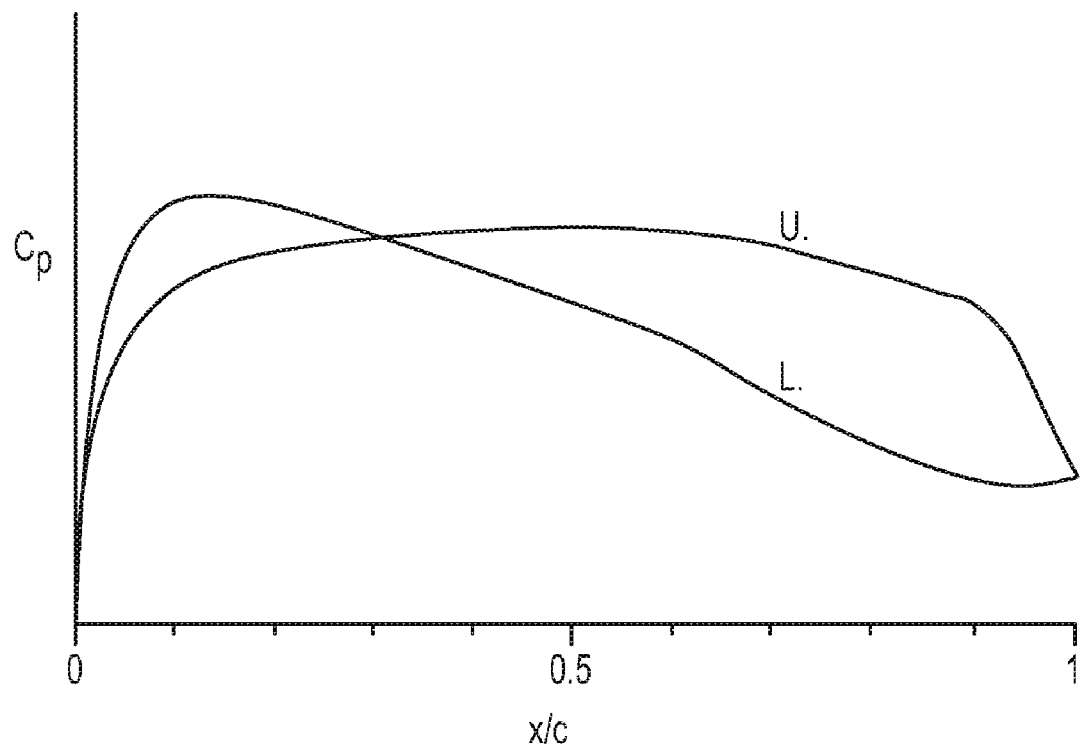
FIG. 12 illustrates a pressure distribution of Point A of FIG. 11 for an exemplary primary airfoil for small blades.

From the preceding discussion, the pressure distributions along the polar can be deduced. The pressure distribution at point A for the primary airfoil is predicted by the inventors to be as shown in FIG. 12. The pressure distributions for the tip and root airfoils should be qualitatively similar. To achieve low drag, a favorable pressure gradient is desirable along the upper surface to about 50-percent chord. Aft of this point, a region having a shallow, adverse pressure gradient ("transition ramp") promotes the efficient transition from laminar to turbulent flow. The curved transition ramp is followed by a convex pressure recovery, which further alleviates laminar separation bubbles. The pressure recovery begins farther forward than dictated by transition-free minimum-drag requirements to decrease the boundary-layer thickness and increase the skin-friction coefficient at the trailing edge with transition fixed, which reduces the noise due to the interaction between the turbulent boundary layer and the trailing edge, a primary noise source for wind turbines. Thus, the specific pressure recovery employed represents a compromise between maximum lift, drag, pitching moment, stall characteristics, and noise. The steep, adverse pressure gradient aft of about 90-percent chord is a "separation ramp," which confines turbulent separation to a small region near the trailing edge. By constraining the movement of the separation point at high angles of attack, high lift coefficients can be achieved with little drag penalty. This feature has the added benefit of initiating docile stall characteristics.

A moderately adverse pressure gradient is desirable along the lower surface to about 60-percent chord to achieve low drag and alleviate laminar separation bubbles. This region is followed by a curved transition ramp and then a concave pressure recovery, which exhibits lower drag and has less tendency to separate than the corresponding linear or convex pressure recovery. The pressure recovery begins farther forward than dictated by transition-free minimum-drag requirements to alleviate separation at lower lift coefficients, especially with transition fixed near the leading edge. The amounts of pressure recovery on the upper and lower surfaces are determined by the airfoil-thickness and pitching-moment constraints.

Figure 13:
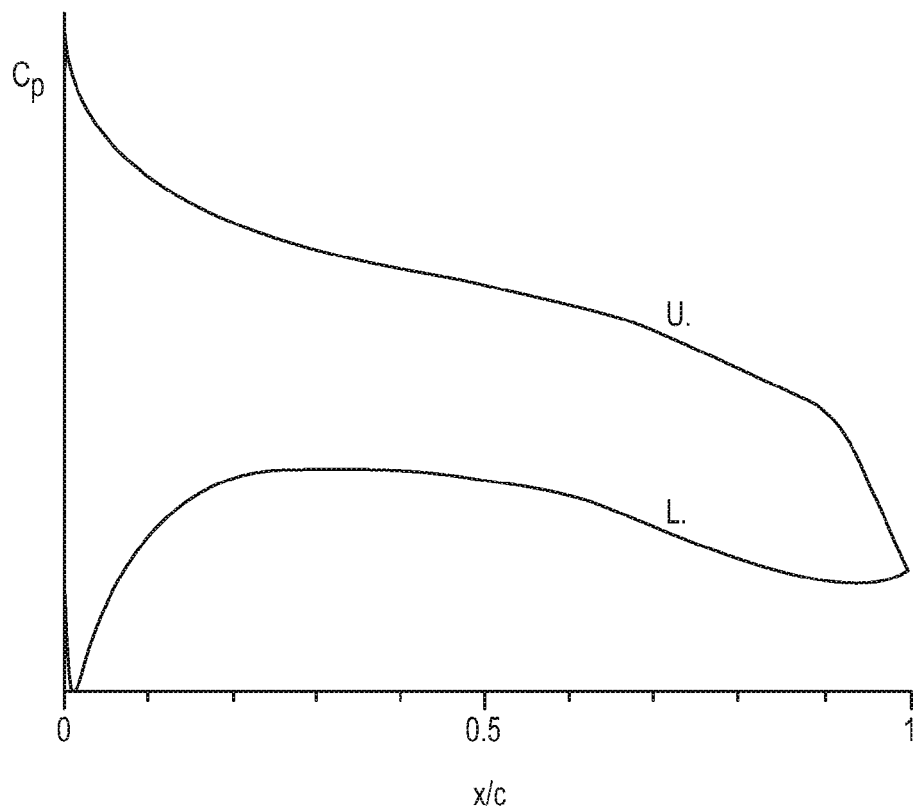
FIG. 13 illustrates a pressure distribution of Point B of FIG. 11 for an exemplary primary airfoil for a small blade airfoil family.

At point B, the pressure distribution should appear as shown in FIG. 13. No suction spike exists at the leading edge. Instead, a rounded peak occurs just aft of the leading edge. Transition is essentially imminent over the entire forward portion of the upper surface. This feature allows a wider low-drag range to be achieved and higher lift coefficients to be reached without significant separation. It also causes transition to move very quickly toward the leading edge with increasing lift coefficient, which leads to the roughness insensitivity of the maximum lift coefficient. Mitigation of laminar separation bubbles, especially on the upper surface, was increasingly emphasized in the family of airfoils for small blades with increasing blade radial station, because of the increasing flow velocity, to eliminate or at least control this possible noise source. Given the pressure distributions previously discussed, the design of the airfoils involves the inverse problem of transforming the pressure distributions into airfoil shapes.

Figure 14:
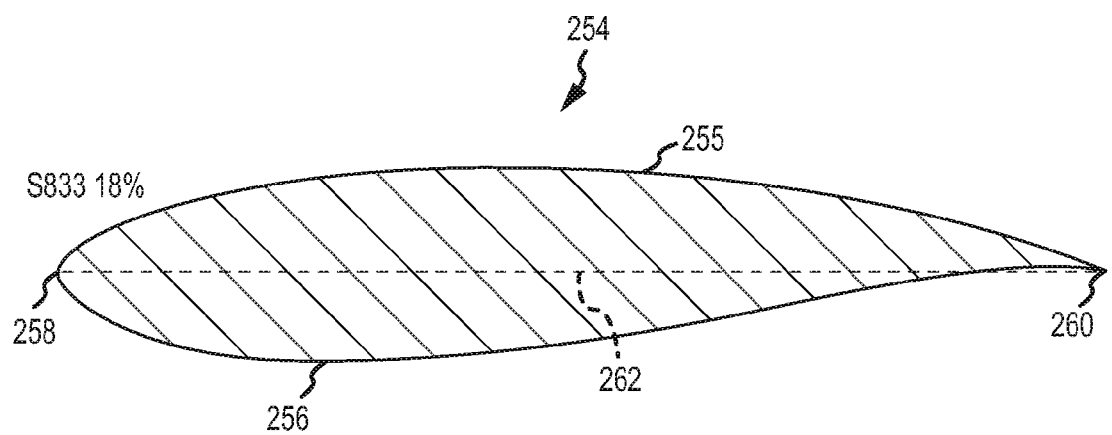
FIG. 14 is a cross-sectional view of a primary or outboard airfoil of a small blade (e.g., 0.5 to 5 meter blade length) airfoil family, such as may be used to define a blade of the turbine of FIG. 1.
Figure 15:
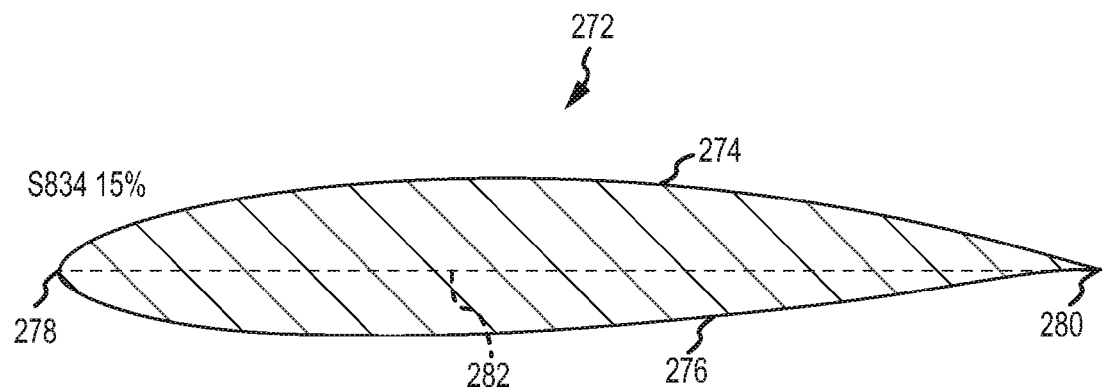
FIG. 15 is a cross-sectional view of a tip region airfoil of the exemplary small blade airfoil family.
Figure 16:
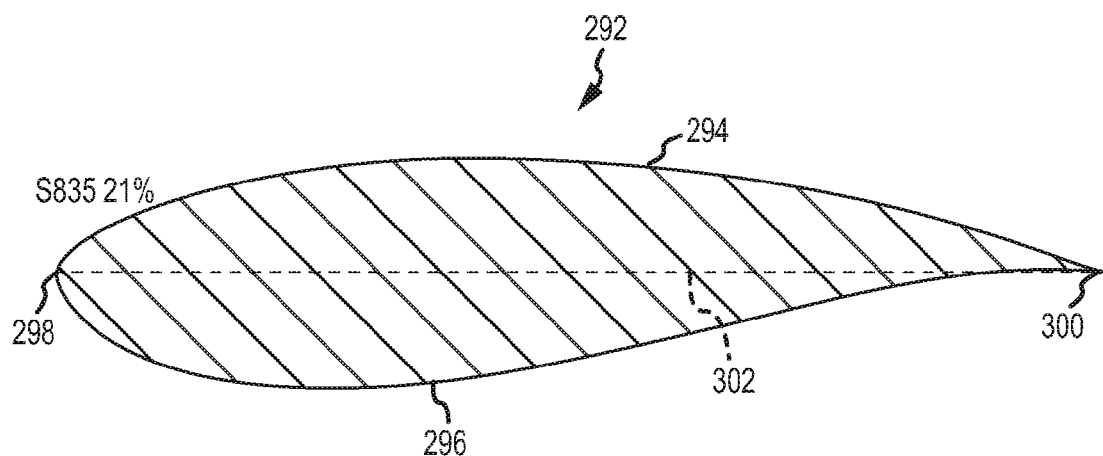
FIG. 16 is a cross-sectional view of a root or inboard airfoil of the exemplary small blade airfoil family.

In the airfoil family for small blades, the primary or outboard airfoil, which corresponds to the 0.75 blade radial station, is designated the S833 airfoil. The tip and root airfoils, the S834 and S835 airfoils, which correspond to the 0.95 and 0.40 blade radial stations, respectively, were derived from the S833 airfoil to increase the aerodynamic and geometric compatibilities of the three airfoils. Again, the specific blade radial stations may vary by plus or minus 10 percent or more (i.e., plus or minus 0.10). The airfoil shapes are shown in FIGS. 14, 15, and 16 and the coordinates defining the airfoil configurations are provided in tables VI, VII, and VIII. The S833 airfoil thickness is about 18-percent chord; the S834 airfoil thickness is about 15-percent chord; and the S835 airfoil thickness is about 21-percent chord.

The S833 Airfoil

Referring to FIG. 14, airfoil 254 (i.e., the S833 airfoil) is shown as it was designed in accordance with this description. The airfoil 254 may be considered a representative example of airfoil 28 in the outboard or midspan region 36 of a blade 22, as was illustrated in FIG. 2, but more typically, the airfoil 254 is located preferably on a blade 22 at a blade radial station of 0.75 (plus or minus 0.10), i.e., a distance away from the axis of rotation 26 that is approximately seventy-five percent (75%) of the length of the blade 22. The airfoil 254 has specific geometric tailoring to achieve a maximum lift coefficient of about 1.10 for a design Reynolds number of at least about 400,000.

The example airfoil 254 includes the upper surface 255 and the lower surface 256 extending between the leading edge 258 and the trailing edge 260. The chord line 262 is formed between the leading edge 258 and the trailing edge 260. The airfoil 254 is designed for the outboard or midspan region 36 of blades between about 0.5 and 5 meters in length. The airfoil 254 also has a maximum thickness of approximately eighteen percent (18%) of the length of the chord 262.

In one embodiment, the specific example shape or contour of the airfoil 254 according to this description is given in Table VI below in the form of dimensionless coordinates x/c and y/c, so that they define the airfoil shape and contour, regardless of whatever the overall size or chord length c of the airfoil. The dimensionless x/c values are ratios of respective distances x between the leading edge 258 and respective reference points on the chord line 262 to the length c of the chord 262. The dimensionless y/c values are ratios of respective heights y from the chord line 262 to respective points either on the upper surface 255 or the lower surface 256 of the airfoil 254. In one part of Table VI, corresponding y/c coordinate values are given for respective x/c coordinate values to define the shape and contours of the upper surface 255 in relation to the chord line 262. Likewise, in another part of Table VI, corresponding y/c coordinate values are given for respective x/c coordinate values to define the shape and contours of the lower surface 256 in relation to the chord line 262. Therefore, for any particular desired chord length c that may be chosen for an airfoil 254 with this shape and contour, the respective x and y coordinates for the upper surface 255 and for the lower surface 256 can be determined from the values in Table VI to produce the airfoil 254 with this shape and contour, as will be understood by persons skilled in the art and as discussed such manufacturing may include tolerances, such as up to about 40 thousandths of an inch (and such tolerances and other manufacturing limitations are considered within the breadth of the coordinates disclosed in Table VI (and Tables VII and VIII). Due to the high curvature or camber of the airfoil 254, the chord line 262 falls partially outside the airfoil 254. Therefore, some of the y/c coordinates for the lower surface in Table VI are negative for the portion of the lower surface 256 of the airfoil 254 that is below the chord line 262, while others of the y/c coordinates for the lower surface in Table VI are positive for the portion of the lower surface 256 of the airfoil 254 that is above the chord line 262.

TABLE VI

S833 AIRFOIL COORDINATES

| Upper Surface | | Lower Surface | |
| --- | --- | --- | --- |
| x/c | y/c | x/c | y/c |
| 0.00014 | 0.00190 | 0.00001 | −0.00039 |
| .00080 | .00413 | .00027 | −.00284 |
| .00134 | .00533 | .00051 | −.00405 |
| .00192 | .00645 | .00516 | −.01488 |
| .00863 | .01509 | .01423 | −.02612 |
| .02100 | .02526 | .02762 | −.03732 |
| .03816 | .03549 | .04509 | −.04794 |
| .05981 | .04544 | .06670 | −.05772 |
| .08580 | .05491 | .09216 | −.06635 |
| .11583 | .06370 | .12149 | −.07365 |
| .14969 | .07168 | .15434 | −.07944 |
| .18700 | .07875 | .19065 | −.08363 |
| .22744 | .08480 | .23002 | −.08613 |
| .27058 | .08979 | .27228 | −.08696 |
| .31595 | .09364 | .31695 | −.08611 |
| .36309 | .09632 | .36379 | −.08365 |
| .41151 | .09778 | .41225 | −.07967 |
| .46067 | .09798 | .46198 | −.07426 |
| .51005 | .09685 | .51236 | −.06755 |
| .55925 | .09430 | .56300 | −.05952 |
| .60790 | .09049 | .61351 | −.05025 |
| .65539 | .08546 | .66384 | −.03971 |
| .70140 | .07919 | .71399 | −.02876 |
| .74562 | .07192 | .76337 | −.01823 |
| .78759 | .06394 | .81124 | −.00889 |
| .82683 | .05549 | .85669 | −.00152 |
| .86284 | .04678 | .89844 | .00302 |
| .89510 | .03796 | .93446 | .00453 |
| .92323 | .02883 | .96316 | .00388 |
| .94764 | .01954 | .98373 | .00224 |
| .96844 | .01109 | .99596 | .00068 |
| .98502 | .00465 | 1.00000 | .00000 |
| .99606 | .00100 | | |
| 1.00000 | .00000 | | |

The section characteristics for the S833 airfoil were predicted for Reynolds numbers of $0.15 \times 10^6$ to $0.70 \times 10^6$. The inventors performed computations with transition free using transition mode 3, with transition fixed at 2-percent chord on the upper surface and 5-percent chord on the lower surface using transition mode 1, and "rough" using transition mode 9, which simulates distributed roughness due to, for example, leading-edge contamination by water drops or insects. Because the free-stream Mach number for all relevant wind-turbine operating conditions remains below 0.3, all results are incompressible.

Pressure distributions were also analyzed by the inventors for the S833 airfoil at various angles of attack. The variation of boundary-layer transition location with lift coefficient for the S833 airfoil indicated that the transition location is defined as the end of the laminar boundary layer whether due to natural transition or laminar separation. Transition is normally confirmed in experiments, however, by the detection of an attached turbulent boundary layer. Thus, for conditions that result in relatively long laminar separation bubbles (low lift coefficients for the upper surface, high lift coefficients for the lower surface, and low Reynolds numbers), the apparent agreement between the theoretical and experimental transition locations is relatively poor. In actuality, the difference between the predicted and measured transition locations represents the length of the laminar separation bubble (from laminar separation to turbulent reattachment). Accordingly, for conditions that result in shorter laminar separation bubbles (high lift coefficients for the upper surface, low lift coefficients for the lower surface, and high Reynolds numbers), the apparent agreement between theory and experiment improves.

The variation of turbulent boundary-layer separation location with lift coefficient for the S833 airfoil was tabulated and a small, trailing-edge separation is predicted on the upper surface at all lift coefficients. This separation is caused by the separation ramp. Separation is predicted on the lower surface at lift coefficients in the lower half of the operating range for the intended application. Such separation usually has little effect on the section characteristics. Regarding section characteristics, the maximum lift coefficient computed is not always realistic and accordingly, an empirical criterion has been applied by the inventors to the computed results that assumes that the maximum lift coefficient has been reached if the drag coefficient of the upper surface is greater than $0.01719$ $(1 \times 10^6/R)^{1/8}$, which is based on correlations with results for Reynolds numbers from $0.7 \times 10^6$ to $1.5 \times 10^6$ from the Pennsylvania State University Low-Speed. Low-Turbulence Wind Tunnel. Thus, the maximum lift coefficient for the design Reynolds number of $0.40 \times 10^6$ is estimated to be 1.10, which meets the design objective. Based on the variation of the upper-surface separation location with lift coefficient, the stall characteristics are expected to be docile, which meets the design goal. Low profile-drag coefficients are predicted over the range of lift coefficients from below 0 to 0.86. Thus, the lower limit of the low-drag, lift-coefficient range is below the design objective of $c_{l,l1}=0.30$, although the upper limit of the low-drag range is also below the design objective of $c_{l,u1}=0.90$, primarily to meet other goals. The zero-lift pitching-moment coefficient is predicted to be –0.14, which satisfies the design constraint. Because of boundary-layer displacement effects not accounted for in the present analysis, the pitching-moment coefficient is generally over predicted by about 20 percent. Therefore, the actual zero-lift pitching-moment coefficient should be about –0.12.

Regarding the effect of roughness on the section characteristics of the S833 airfoil, the maximum lift coefficient for the design Reynolds number of $0.40 \times 10^6$ with transition fixed is estimated to be 1.11, an increase of 1 percent from that with transition free. For the rough condition, the maximum lift coefficient for the design Reynolds number is estimated to be 1.13, an increase of 3 percent from that with transition free. Thus, the design requirement has been satisfied. The effect of roughness on the maximum lift coefficient is nearly constant with Reynolds number. The drag coefficients are, of course, adversely affected by the roughness.

The S834 Airfoil

Referring to FIG. 15, airfoil 272 (i.e., the S834 airfoil) is shown as it was designed in accordance with the concepts described herein. The airfoil 272 may be considered a representative example of airfoil 29 in the tip region 32 of a blade 22, as was illustrated in FIG. 2, but more typically, the airfoil 272 is located preferably on a blade 22 at a blade radial station of 0.95 (plus or minus 0.10 or a range of 0.85 to 1.00), i.e., on a blade 22 at a distance away from the axis of rotation 26 that is approximately ninety-five percent (95%) of the length of the blade 22. The airfoil 272 has specific geometric tailoring to achieve a maximum lift coefficient of about 1.0 for a Reynolds number of about 400,000 or larger. The airfoil 272 includes the upper surface 274 and the lower surface 276 with the leading edge 278 and the trailing edge 280. The chord line 282 is formed between the leading edge 278 and the trailing edge 280. The airfoil 272 is designed for the tip region 32 of blades between about 0.5 to 5 meters in length. The airfoil 272 also has a maximum thickness of approximately fifteen percent (15%) of the length of the chord 282.

According to one embodiment, the specific shape or contour of the airfoil 272 is given in Table VII in the form of dimensionless coordinates in the same manner as explained above for the S833 airfoil. Briefly, though, the x/c values represent locations on the chord line 282 in relation to the leading edge 278. The y/c values represent heights from the chord line 282 to points either on the upper surface 274 or the lower surface 276 of the airfoil 272. The x/c and y/c values are given for both the upper surface 274 and the lower surface 276 of the airfoil 272 in Table VII in a similar manner as explained above for Table VI.

TABLE VII

S834 AIRFOIL COORDINATES

| Upper Surface | | Lower Surface | |
|---|---|---|---|
| x/c | y/c | x/c | y/c |
| 0.00000 | 0.00009 | 0.00025 | −0.00167 |
| .00031 | .00185 | .00063 | −.00286 |
| .00104 | .00375 | .00092 | −.00356 |
| .00139 | .00447 | .00610 | −.01100 |
| .00812 | .01297 | .01637 | −.01945 |
| .01966 | .02200 | .03135 | −.02779 |
| .03587 | .03119 | .05077 | −.03563 |
| .05652 | .04019 | .07463 | −.04274 |
| .08148 | .04879 | .10266 | −.04895 |
| .11050 | .05682 | .13476 | −.05414 |
| .14337 | .06413 | .17060 | −.05824 |
| .17974 | .07061 | .20996 | −.06119 |
| .21930 | .07620 | .25241 | −.06300 |
| .26160 | .08080 | .29766 | −.06367 |
| .30625 | .08437 | .34519 | −.06325 |
| .35274 | .08686 | .39461 | −.06181 |
| .40059 | .08820 | .44534 | −.05943 |
| .44927 | .08834 | .49692 | −.05621 |
| .49829 | .08714 | .54874 | −.05227 |
| .54733 | .08453 | .60025 | −.04770 |
| .59606 | .08071 | .65083 | −.04259 |
| .64386 | .07578 | .69997 | −.03702 |
| .69034 | .06973 | .74713 | −.03111 |
| .73517 | .06273 | .79183 | −.02494 |
| .77797 | .05503 | .83359 | −.01867 |
| .81829 | .04693 | .87225 | −.01217 |
| .85565 | .03870 | .90787 | −.00651 |
| .88950 | .03056 | .93921 | −.00253 |
| .91941 | .02247 | .96502 | −.00033 |
| .94548 | .01465 | .98421 | .00039 |
| .96754 | .00791 | .99602 | .00024 |
| .98482 | .00310 | 1.00000 | .00000 |
| .99606 | .00061 | | |
| 1.00000 | .00000 | | |

Pressure distributions for the S834 airfoil at various angles of attack were tabulated by the inventors. Based on these calculations, the variations of transition and separation locations with lift coefficient for the S834 airfoil were determined and a small, trailing-edge separation is predicted on the upper surface at all lift coefficients. This separation is caused by the separation ramp. Separation is predicted on the lower surface at lift coefficients below the operating range for the intended application and such separation usually has little effect on the section characteristics. The section characteristics of the S834 airfoil were also tabulated and using the previously described criterion, the maximum lift coefficient for the design Reynolds number of $0.40 \times 10^6$ is estimated to be 1.00, which meets the design objective. The stall characteristics are expected to be docile, which meets the design goal. Low drag coefficients are predicted over the range of lift coefficients from below 0 to 0.78. Thus, the lower limit of the low-drag range is below the design objective of $c_{l,l1}=0.20$, although the upper limit is also below the design objective of $c_{l,u1}=0.80$, primarily to meet other goals. The zero-lift pitching-moment coefficient is predicted to be −0.08, which satisfies the design constraint. The actual zero-lift pitching-moment coefficient should be about −0.06.

Regarding the effect of roughness on the section characteristics, the maximum lift coefficient for the design Reynolds number of $0.40 \times 10^6$ is unaffected by fixing transition because transition on the upper surface is predicted to occur forward of 2-percent chord at the maximum lift coefficient. For the rough condition, the maximum lift coefficient for the design Reynolds number is estimated to be 1.02, an increase of 2 percent from that with transition free. Thus, the design requirement has been satisfied. The effect of roughness on the maximum lift coefficient is nearly constant with Reynolds number. The drag coefficients are, of course, adversely affected by the roughness.

The S835 Airfoil

Referring to FIG. 16, airfoil 292 (i.e., the S835 airfoil) is shown as it was designed in accordance with the concepts described herein. The airfoil 292 may be considered a representative example of airfoil 27 in the root region 34 of a blade 22, as was illustrated in FIG. 2, but more typically, the airfoil 292 is preferably located at a blade radial station of about 0.40 on a blade 22 (or in a station range of 0.30 to 0.50 or plus or minus 0.10), i.e., at a distance away from the axis of rotation 26 that is approximately forty percent (40%) of the length of the blade 22.

The airfoil 292 has specific geometric tailoring to achieve a maximum lift coefficient of approximately 1.20 for a Reynolds number of approximately 250,000. The airfoil 292 includes the upper surface 294 and the lower surface 296 with the leading edge 298 and the trailing edge 300. The chord line 302 is formed between the leading edge 298 and the trailing edge 300. The airfoil 292 is designed for the outboard region 34 of blades between about 0.5 and 5 meters in length. The airfoil 292 also has a maximum thickness of approximately twenty-one percent (21%) for the length of the chord 302.

In one embodiment, the specific shape or contour of the airfoil 292 is given in Table VIII in the form of dimensionless coordinates in the same manner as explained above for the S833 airfoil. Briefly, though, the x/c values represent locations on the length of chord line 302 in relation to the leading edge 298. The y/c values represent heights from the chord line 302 to points either on the upper surface 294 or the lower surface 296 of the airfoil 292. The x/c and y/c values are given for both the upper surface 294 and the lower surface 296 of the airfoil 292 in Table VIII in a similar manner as explained above for fable VI.

TABLE IV

S835 AIRFOIL COORDINATES

| Upper Surface | | Lower Surface | |
| --- | --- | --- | --- |
| x/c | y/c | x/c | y/c |
| 0.00002 | 0.00099 | 0.00111 | −0.00887 |
| .00023 | .00376 | .00638 | −.02253 |
| .00026 | .00397 | .01577 | −.03657 |
| .00087 | .00677 | .02908 | −.05033 |
| .00200 | .00947 | .04631 | −.06347 |
| .00357 | .01220 | .06721 | −.07550 |
| .00537 | .01477 | .09182 | −.08620 |
| .01649 | .02603 | .11982 | −.09519 |
| .03266 | .03735 | .15121 | −.10230 |
| .05347 | .04838 | .18563 | −.10723 |
| .07871 | .05889 | .22322 | −.10980 |
| .10805 | .06868 | .26372 | −.11014 |
| .14127 | .07759 | .30684 | −.10829 |
| .17797 | .08549 | .35227 | −.10430 |
| .21782 | .09226 | .39970 | −.09827 |
| .26037 | .09783 | .44881 | −.09036 |

TABLE IV-continued

S835 AIRFOIL COORDINATES

| Upper Surface | | Lower Surface | |
| --- | --- | --- | --- |
| x/c | y/c | x/c | y/c |
| .30519 | .10211 | .49928 | −.08081 |
| .35178 | .10500 | .55072 | −.06993 |
| .39966 | .10638 | .60277 | −.05811 |
| .44851 | .10620 | .65496 | −.04582 |
| .49774 | .10448 | .70679 | −.03361 |
| .54703 | .10115 | .75764 | −.02211 |
| .59600 | .09636 | .80676 | −.01199 |
| .64420 | .09028 | .85324 | −.00393 |
| .69117 | .08310 | .89582 | .00127 |
| .73644 | .07503 | .93260 | .00343 |
| .77953 | .06631 | .96201 | .00332 |
| .81994 | .05718 | .98319 | .00204 |
| .85715 | .04786 | .99583 | .00064 |
| .89062 | .03853 | 1.00000 | .00000 |
| .91994 | .02902 | | |
| .94546 | .01950 | | |
| .96719 | .01097 | | |
| .98447 | .00455 | | |
| .99593 | .00097 | | |
| 1.00000 | .00000 | | |

Pressure distributions for the S835 airfoil were determined at various angles of attack, and transition and separation locations were determined based on these pressure distributions. A small, trailing-edge separation is predicted on the upper surface at all lift coefficients. This separation is caused by the separation ramp. Separation is predicted on the lower surface at all lift coefficients within the operating range for the intended application. Such separation usually has little effect on the section characteristics. The section characteristics of the S835 airfoil were also determined and using the previously described criterion, the maximum lift coefficient for the design Reynolds number of $0.25 \times 10^6$ is estimated to be 1.04, which does not meet the design objective of $c_{l,max}=1.20$, primarily because the objective is incompatible with the other requirements, especially the combination of large airfoil thickness and low Reynolds number. The stall characteristics are expected to be docile, which meets the design goal. Low drag coefficients are predicted over the range of lift coefficients from below 0 to 0.94. Thus, the lower limit of the low-drag range is below the design objective of $c_{l,ll}=0.40$, although the upper limit is also below the design objective of $c_{l,ul}=1.00$, primarily to meet other goals. The zero-lift pitching-moment coefficient is predicted to be −0.14, which satisfies the design constraint. The actual zero-lift pitching-moment coefficient should be about −0.12.

Regarding the effect of roughness on the section characteristics of the S835 airfoil, the maximum lift coefficient for the design Reynolds number of $0.25 \times 10^6$ with transition fixed is estimated to be 1.00, a reduction of 4 percent from that with transition free. For the rough condition, the maximum lift coefficient for the design Reynolds number is estimated to be 1.03, a reduction of 1 percent from that with transition free. Thus, the design requirement has been satisfied. The effect of roughness on the maximum lift coefficient is nearly constant with Reynolds number. The drag coefficients are, of course, adversely affected by the roughness.

Based on the above discussion, it can be seen that the concepts described herein provide a family of quiet, thick, natural-laminar-flow airfoils, i.e., the S833, S834, and S835 airfoils, for 0.5 to 5 meter blade-length, variable-speed/variable-pitch, horizontal-axis wind turbines. The inventors have theoretically analyzed the designs described, and the objectives of high maximum lift coefficients, relative insensitivity to leading-edge roughness, and low profile-drag coefficients have generally been achieved. Additionally, the airfoils should exhibit docile stall characteristics during operation, and the designs of the small blade airfoil family satisfy the constraints on the zero-lift pitching-moment coefficient and the airfoil thicknesses.

Although the concepts have been described and illustrated with a certain degree of particularity, it is understood that the present disclosure has been made only by way of example, and that numerous changes in the combination and arrangement of parts can be resorted to by those skilled in the art without departing from the spirit and scope of the description, as hereinafter claimed.

We claim:

1. A blade for large wind turbines rotatable about a horizontal axis, the blade being adapted for mounting to a hub on the turbines for rotation about said horizontal axis and extending a distance radially outward from the horizontal axis to a tip, the blade comprising:
   a primary span region extending from a point that is approximately sixty-five percent of the distance radially outward from the horizontal axis to a point that is approximately eighty-five percent of the distance radially outward from the horizontal axis; and
   a primary airfoil in the primary span region, the primary airfoil having a thickness of at least about twenty-one percent, a Reynolds number of at least about 4,000,000, and a maximum lift coefficient of about 1.6.

2. The blade of claim 1, wherein the blade has a length in the range of about 20 to 50 meters as measured from the horizontal axis to the tip.

3. The blade of claim 1, wherein the primary airfoil further comprises:
   an upper surface and a lower surface, both of which extend spaced-apart in relation to each other from a leading edge to a trailing edge; and
   a chord line with a length c extending in a straight line between the leading edge and the trailing edge, said upper surface and said lower surface having shapes and contours expressed by x/c values and y/c values, wherein the x/c values are dimensionless coordinates that represent locations on the length of the chord line and the y/c values are dimensionless coordinates that represent heights from the chord line to points on the upper surface and on the lower surface substantially as follows:

| Upper Surface | | Lower Surface | |
|---|---|---|---|
| x/c | y/c | x/c | y/c |
| 0.00006 | 0.00112 | 0.00004 | −0.00084 |
| .00321 | .01040 | .00041 | −.00254 |
| .01104 | .02127 | .00138 | −.00406 |
| .02343 | .03307 | .00288 | −.00560 |
| .04015 | .04540 | .01318 | −.01192 |
| .06101 | .05794 | .02942 | −.01794 |
| .08576 | .07041 | .05165 | −.02385 |
| .11413 | .08253 | .07932 | −.03013 |
| .14580 | .09406 | .11146 | −.03674 |
| .18042 | .10474 | .14756 | −.04351 |
| .21762 | .11434 | .18687 | −.05030 |
| .25699 | .12262 | .22887 | −.05701 |
| .29810 | .12934 | .27253 | −.06393 |
| .34048 | .13417 | .31589 | −.07002 |
| .38383 | .13653 | .35873 | −.07334 |
| .42854 | .13632 | .40193 | −.07288 |
| .47434 | .13395 | .44627 | −.06859 |
| .52084 | .12962 | .49216 | −.06086 |
| .56764 | .12354 | .53971 | −.04984 |
| .61431 | .11592 | .59018 | −.03645 |
| .66042 | .10703 | .64307 | −.02282 |
| .70550 | .09715 | .69724 | −.01029 |
| .74904 | .08657 | .75132 | .00013 |

-continued

| Upper Surface | | Lower Surface | |
|---|---|---|---|
| x/c | y/c | x/c | y/c |
| .79053 | .07559 | .80381 | .00775 |
| .82943 | .06449 | .85314 | .01212 |
| .86518 | .05352 | .89755 | .01296 |
| .89719 | .04283 | .93491 | .01083 |
| .92504 | .03222 | .96391 | .00721 |
| .94908 | .02179 | .98422 | .00357 |
| .96943 | .01245 | .99611 | .00096 |
| .98554 | .00533 | 1.00000 | .00000 |
| .99621 | .00120 | | |
| 1.00000 | .00000. | | |

4. The blade of claim 1, wherein the primary airfoil is positioned at a blade radial station of about 0.75.

5. The blade of claim 1, further comprising:
   an intermediate span region extending from a point that is approximately eighty percent of the distance radially outward from the horizontal axis to a point that is approximately one hundred percent of the distance radially outward from the horizontal axis; and
   an intermediate airfoil positioned radially outboard from the primary airfoil in the intermediate span region, the intermediate airfoil having a thickness of at least about eighteen percent, a Reynolds number of at least about 3,500,000, and a maximum lift coefficient of about 1.5.

6. The blade of claim 5, wherein the intermediate airfoil is positioned at a blade radial station of about 0.90.

7. The blade of claim 5, wherein the intermediate airfoil further comprises: an upper surface and a lower surface, both of which extend spaced-apart in relation to each other from a leading edge to a trailing edge; and
   a chord line with a length c extending in a straight line between the leading edge and the trailing edge, said upper surface and said lower surface having shapes and contours expressed by x/c values and y/c values, wherein the x/c values are dimensionless coordinates that represent locations on the length of the chord line and the y/c values are dimensionless coordinates that represent heights from the chord line to points on the upper surface and on the lower surface substantially as follows:

| Upper Surface | | Lower Surface | |
|---|---|---|---|
| x/c | y/c | x/c | y/c |
| 0.00004 | 0.00088 | 0.00004 | −0.00080 |
| .00036 | .00277 | .00017 | −.00155 |
| .00449 | .01168 | .00041 | −.00221 |
| .01307 | .02201 | .00080 | −.00281 |
| .02606 | .03319 | .00134 | −.00340 |
| .04333 | .04479 | .00280 | −.00458 |
| .06483 | .05655 | .00966 | −.00795 |
| .09031 | .06828 | .02422 | −.01170 |
| .11951 | .07975 | .04525 | −.01480 |
| .15212 | .09077 | .07229 | −.017% |
| .18776 | .10113 | .10441 | −.02131 |
| 22608 | .11064 | .14105 | −.02479 |
| 26663 | .11912 | .18146 | −.02831 |
| 30899 | .12638 | 22509 | −.03171 |
| .35269 | .13226 | 27122 | −.03485 |
| 39728 | .13659 | .31929 | −.03752 |
| .44223 | .13917 | 36859 | −.03951 |
| .48707 | .13978 | .41855 | −.04054 |
| 53137 | .13799 | .46850 | −.04013 |
| .57522 | .13349 | 51847 | −.03767 |
| .61871 | .12640 | 56861 | −.03326 |
| .66185 | .11707 | .61888 | −.02718 |
| .70445 | .10608 | .66924 | −.01993 |

-continued

| Upper Surface | | Lower Surface | |
|---|---|---|---|
| x/c | y/c | x/c | y/c |
| .74609 | .09394 | .71934 | −.01226 |
| .78632 | .08116 | .76865 | −00492 |
| .82460 | .06818 | .81639 | .00118 |
| .86035 | .05544 | .86130 | .00530 |
| .89294 | .04327 | .90193 | .00707 |
| .92180 | .03167 | .93666 | .00668 |
| .94699 | .02083 | .96429 | .00489 |
| .96834 | .01157 | .98416 | .00263 |
| .98514 | .00481 | .99606 | .00077 |
| .99614 | .00105 | 1.00000 | .00000 |
| 1.00000 | .00000. | | |

8. The blade of claim 1, further comprising:
a tip span region extending from a point that is approximately ninety percent of the distance radially outward from the horizontal axis to a point that is approximately one hundred percent of the distance radially outward from the horizontal axis; and
a tip airfoil positioned radially outboard from the primary airfoil in the tip span region, the tip airfoil having a thickness of at least about fifteen percent, a Reynolds number of at least about 2,500,000, and a maximum lift coefficient of about 1.4.

9. The blade of claim 8, wherein the intermediate airfoil is positioned at a blade radial station of about 1.0.

10. The blade of claim 8, wherein the intermediate airfoil further comprises: an upper surface and a lower surface, both of which extend spaced-apart in relation to each other from a leading edge to a trailing edge; and
a chord line with a length c extending in a straight line between the leading edge and the trailing edge, said upper surface and said lower surface having shapes and contours expressed by x/c values and y/c values, wherein the x/c values are dimensionless coordinates that represent locations on the length of the chord line and the y/c values are dimensionless coordinates that represent heights from the chord line to points on the upper surface and on the lower surface substantially as follows:

| Upper Surface | | Lower Surface | |
|---|---|---|---|
| x/c | y/c | x/c | y/c |
| 0.00000 | 0.00028 | 0.00010 | −0.00126 |
| .00011 | .00150 | .00026 | −.00194 |
| .00328 | .00973 | .00053 | −.00252 |
| .01071 | .01942 | .00094 | −.00303 |
| .02242 | .03000 | .00150 | −.00353 |
| .03830 | .04102 | .00188 | −.00380 |
| .05831 | .05217 | .00298 | −.00448 |
| .08228 | .015320 | .01074 | −.00728 |
| .11007 | .07390 | .02577 | −.00958 |
| .14137 | .08415 | .04734 | −.01088 |
| .17583 | .C9376 | .07510 | −.01192 |
| 21310 | .10256 | .10825 | −.01295 |
| 25274 | .11037 | .14628 | −.01404 |
| 29436 | .11701 | .18846 | −.01522 |
| 33747 | .12233 | 23423 | −.01649 |
| 38161 | .12614 | 28287 | −.01779 |
| .42629 | .12824 | 33377 | −.01907 |
| .47105 | .12830 | 38622 | −.02025 |
| .51577 | .12599 | .43959 | −.02122 |

-continued

| Upper Surface | | Lower Surface | |
|---|---|---|---|
| x/c | y/c | x/c | y/c |
| .56040 | .12129 | .49317 | −.02188 |
| .60480 | .11436 | .54634 | −.02208 |
| .64882 | .10544 | .59843 | −.02158 |
| .69229 | .09486 | .64911 | −.02005 |
| .73496 | .08312 | .69821 | −.01745 |
| .77642 | .07079 | .74555 | −.01394 |
| .81614 | .05839 | .79090 | −.00991 |
| .85352 | .04638 | .83384 | −.00585 |
| .88788 | .03517 | .87378 | −.00234 |
| 91858 | .02488 | .90980 | .00013 |
| .94539 | .01576 | .94089 | .00144 |
| .%785 | .00839 | 96513 | .00169 |
| .98514 | .00333 | .98476 | .00118 |
| .99619 | .00069 | .99616 | .00041 |
| 1.00000 | .00000 | 1.00000 | .00000. |

11. A wind turbine that rotates about a horizontal axis, comprising:
a plurality of turbine blades mounted to a hub of the wind turbine for rotation about the horizontal axis and extending a distance radially outward from the horizontal axis to a tip;
an airfoil family defining cross-sections of each of the blades, the airfoil family comprising an inboard airfoil with a thickness of at least about 21 percent, a tip airfoil proximal to the tip of the blade with a thickness of at least about 15 percent, and an intermediate airfoil positioned between the inboard and tip airfoils with a thickness of at least about 18 percent;
wherein the turbine blades have a length measured from the horizontal axis to the tip of at least about 20 meters and wherein each of the blades further comprises:
a primary span region extending from a point that is approximately sixty-five percent of the distance radially outward from the horizontal axis to a point that is approximately eighty-five percent of the distance radially outward from the horizontal axis, wherein the inboard airfoil is positioned in the primary span region, the inboard airfoil having a Reynolds number of at least about 4,000,000 and a maximum lift coefficient of about 1.6;
an intermediate span region extending from a point that is approximately eighty percent of the distance radially outward from the horizontal axis to a point that is approximately one hundred percent of the distance radially outward from the horizontal axis, wherein the intermediate airfoil is positioned radially outboard from the inboard airfoil in the intermediate span region, the intermediate airfoil having a Reynolds number of at least about 3,500,000 and a maximum lift coefficient of about 1.5; and
a tip span region extending from a point that is approximately ninety percent of the distance radially outward from the horizontal axis to a point that is approximately one hundred percent of the distance radially outward from the horizontal axis, wherein the tip airfoil is positioned radially outboard from the intermediate airfoil in the tip span region, the tip airfoil having a Reynolds number of at least about 2,500,000 and a maximum lift coefficient of about 1.4.

* * * * *